US009723248B1

(12) United States Patent
Colburn et al.

(10) Patent No.: US 9,723,248 B1
(45) Date of Patent: Aug. 1, 2017

(54) PERSPECTIVE-AWARE PROJECTED USER INTERFACES

(71) Applicant: Amazon Technologies, Inc., Seattle, WA (US)

(72) Inventors: Robert Alexander Colburn, Seattle, WA (US); James Christopher Curlander, Mercer Island, WA (US); Gurunandan Krishnan Gorumkonda, Seattle, WA (US); Lilian de Greef, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 187 days.

(21) Appl. No.: 14/612,180

(22) Filed: Feb. 2, 2015

(51) Int. Cl.
| H04N 7/18 | (2006.01) |
| H04N 5/74 | (2006.01) |
| G06F 3/01 | (2006.01) |
| G06T 15/20 | (2011.01) |
| G06K 9/00 | (2006.01) |
| G06K 9/78 | (2006.01) |

(52) U.S. Cl.
CPC ............ *H04N 5/7458* (2013.01); *G06F 3/011* (2013.01); *G06T 15/205* (2013.01); *H04N 7/18* (2013.01)

(58) Field of Classification Search
CPC ............. A63F 13/12; A63F 2300/5553; G06F 3/04815; G06F 3/011; H04L 29/06034; H04N 5/7458; H04N 7/18; G06T 15/205
See application file for complete search history.

(56) References Cited

U.S. PATENT DOCUMENTS

| 6,592,033 B2 * | 7/2003 | Jennings ............... G06K 9/00 235/378 |
| 6,803,928 B2 * | 10/2004 | Bimber ............... G05B 19/186 345/419 |
| 7,069,516 B2 * | 6/2006 | Rekimoto ............... G06F 3/011 715/757 |
| 9,299,013 B1 * | 3/2016 | Curlander ............... G06K 9/78 |
| 2009/0207322 A1 * | 8/2009 | Mizuuchi ............... G03B 21/14 348/745 |
| 2015/0348324 A1 * | 12/2015 | Vaughn ............... G06T 19/006 345/633 |

(Continued)

OTHER PUBLICATIONS

Bimber, Oliver et al., "The Visual Computing of Projector-Camera Systems", Eurographics, STAR—State of the Art Report, The Eurographics Association, 2007, 25 pages.

(Continued)

*Primary Examiner* — Sath V Perungavoor
*Assistant Examiner* — Howard D Brown, Jr.
(74) *Attorney, Agent, or Firm* — Athorus, PLLC

(57) ABSTRACT

Information regarding actions or activities to be performed at a workstation may be projected upon a portion of the workstation using one or more projectors. The information may include one or more arrows or other indicators referencing specific tools, materials or objects that may be used to perform one or more of the actions or activities. Such arrows or indicators may be rendered in a manner that simulates a three-dimensional or floating appearance thereof from a perspective of a user that may be adjusted or modified based on changes in the perspective of the user, and with respect to one or more physical or virtual sources of light.

20 Claims, 14 Drawing Sheets

(56) References Cited

U.S. PATENT DOCUMENTS

2016/0078678 A1* 3/2016 Hotte .............. G06Q 10/06311
705/7.13

OTHER PUBLICATIONS

Nacenta, Miguel A. et al., "E-conic: a Perspective-Aware Interface for Multi-Display Environments", UIST '07, Oct. 7-10, 2007, Newport, Rhode Island, USA, pp. 279-288.
Raskar, Ramesh et al., "The Office of the Future: A Unified Approach to Image-Based Modeling and Spatially Immersive Displays", SIGGRAPH 98, Orlando, Florida, Jul. 19-24, 1998, Computer Graphics and Proceedings, Annual Conference Series, pp. 1-10.
Tonnis, Marcus et al., "Representing information—Classifying the Augmented Reality presentation space", Computers & Graphics 37, 2013, pp. 997-1011.
Welch, Greg et al., "Projected Imagery in Your 'Office of the Future'", Jul./Aug. 2000, IEEE Computer Graphics and Applications, pp. 62-67.
Wilson, Andrew D., "PlayAnywhere: A Compact Interactive Tabletop Projection-Vision System", Microsoft Research, UIST '05, Oct. 23-27, 2005, Seattle, Washington, USA, pp. 83-92.
Xiao, Robert et al., "WorldKit: Rapid and Easy Creation of Ad-hoc Interactive Applications on Everyday Surfaces" Human-Computer Interaction Institute, Carnegie Mellon University, CHI 2013, Apr. 27-May 2, 2013, Paris, France, pp. 879-888.

* cited by examiner

PERSPECTIVE OF WORKER 450
AT TIME t₁

PERSPECTIVE OF THIRD PARTY
AT TIME t₁

PERSPECTIVE OF WORKER 450
AT TIME t₂

PERSPECTIVE OF THIRD PARTY
AT TIME t₂

PERSPECTIVE-AWARE PROJECTED USER INTERFACES

BACKGROUND

Presently, information regarding one or more complex, multi-step tasks may be provided to users electronically, e.g., on one or more monitors, screens or other displays. For example, where a worker in an industrial or commercial environment is performing a task having a number of mandatory steps or actions, the various steps or actions required in order to accomplish the task may be shown to the worker on a computer display associated with a computer having a keyboard, mouse or other interactive device. The computer display may be mounted to one or more structural components or features of a workstation, and may display information regarding such steps or actions to a worker, who may read and comprehend the information, and execute the steps shown on the computer display in an order in which such steps are presented.

The use of computer displays to provide instructions to workers provides a number of advantages over prior art systems such as printed textbooks or other articles upon which text may be stamped or written. For example, the computer displays may provide customized or updated instructions to such workers more easily and efficiently than such other systems, and may be provided in conjunction with one or more tracking systems for monitoring a worker's performance of the one or more steps associated with the various tasks. Likewise, a single computer display may be programmed to display unique instructions for the performance of multiple tasks on a common user interface.

However, in order to read, recognize and respond to the instructions provided on a computer display mounted above or alongside a working surface of a workstation, e.g., in a location that does not interfere with the work being performed on the working surface or elsewhere at the workstation, a worker must first look at the computer display, and then look at his or her working surface, making any number of head movements, pivots or rotations that may be necessary in order to focus on the instructions shown on the computer display and the performance of the task on the working surface. Frequently, particularly for difficult or intricate tasks involving a number of tools, materials or other objects, tasks including a number of mandatory steps or actions, or tasks lasting an extended period of time, the worker is required to alternate between looking at the computer display and at the working surface several times in order to execute each step of the task.

Maintaining a physical separation between the computer display and the working surface results in a number of challenges. First, where a worker is unfamiliar with the layout or arrangement of a workstation or a working surface, or the tools, materials or other objects that are available there, the separation between the display and the working surface cannot aid the worker in finding such tools, materials or objects that are required in order to complete a task. Next, where a worker is tasked with completing tasks at a high rate of speed, the need to look first at a computer display and then at a working surface, and then at the computer display and at the working surface again several times, may cause the worker to fail to acknowledge critical information or recognize and perform one or more key steps or actions.

DETAILED DESCRIPTION

As is set forth in greater detail below, the present disclosure is directed to providing perspective-aware projected user interfaces. More specifically, the systems and methods disclosed herein operate by tracking one or more aspects of a user's head (e.g., his or her face or eyes), determining a perspective of the user, e.g., the appearance to an eye of the user of objects in respect to their relative distance and positions, based on an orientation of one or more of such aspects, and projecting information onto a planar surface in a manner that renders the information visible to the user from his perspective. In particular, at least some of the information may include arrows, markers, characters or other illustrative features that are projected upon a surface in a manner that realistically simulates a three-dimensional appearance or view of one or more of the features, and further enriches the efficacy and prominence of the presented information or features from a vantage point of a user for whom such information or features are intended to be read and interpreted.

Figure 1A:
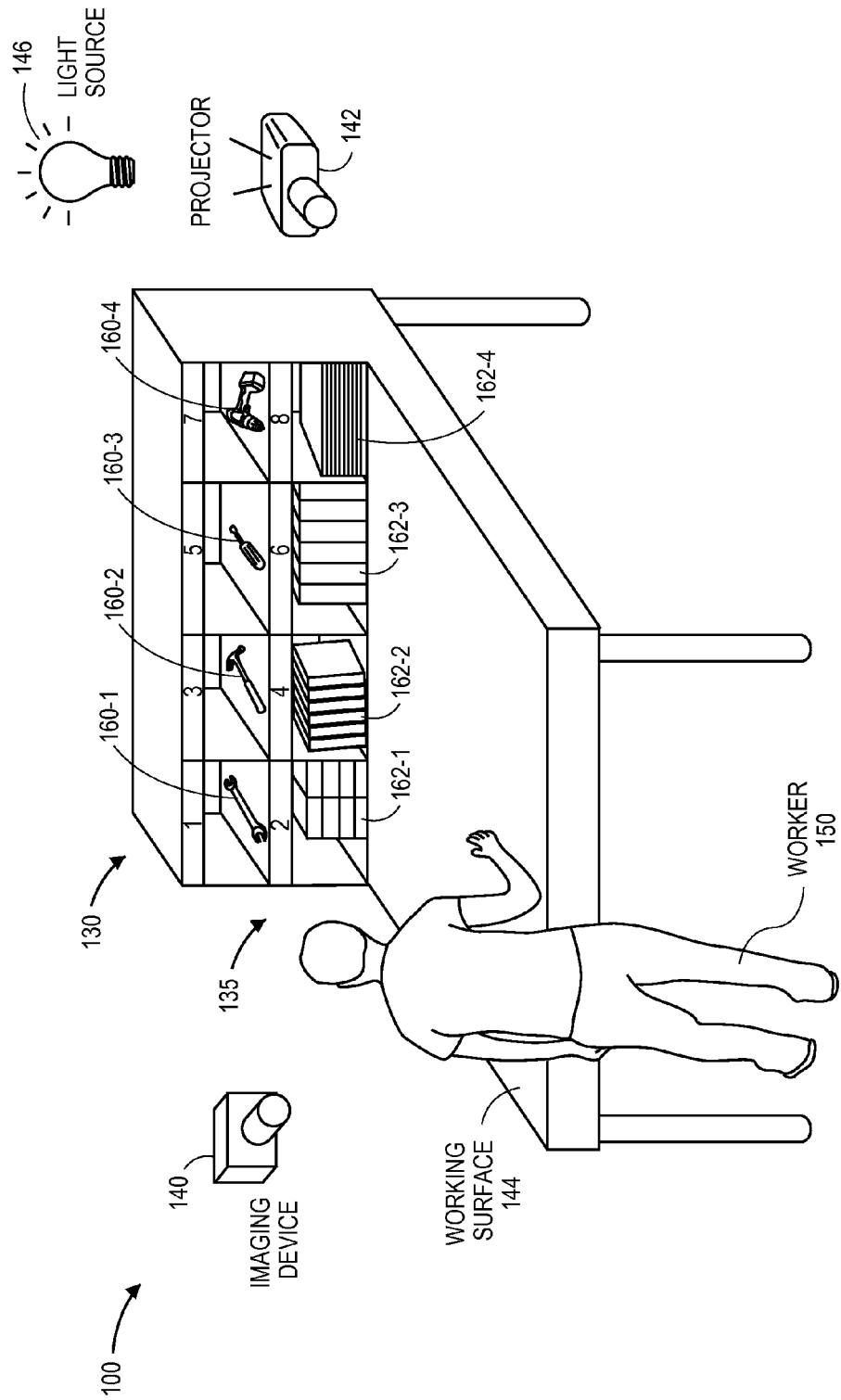
FIGS. 1A and 1B are views of aspects of one system for displaying perspective-aware projected user interfaces in accordance with embodiments of the present disclosure.
Figure 1B:
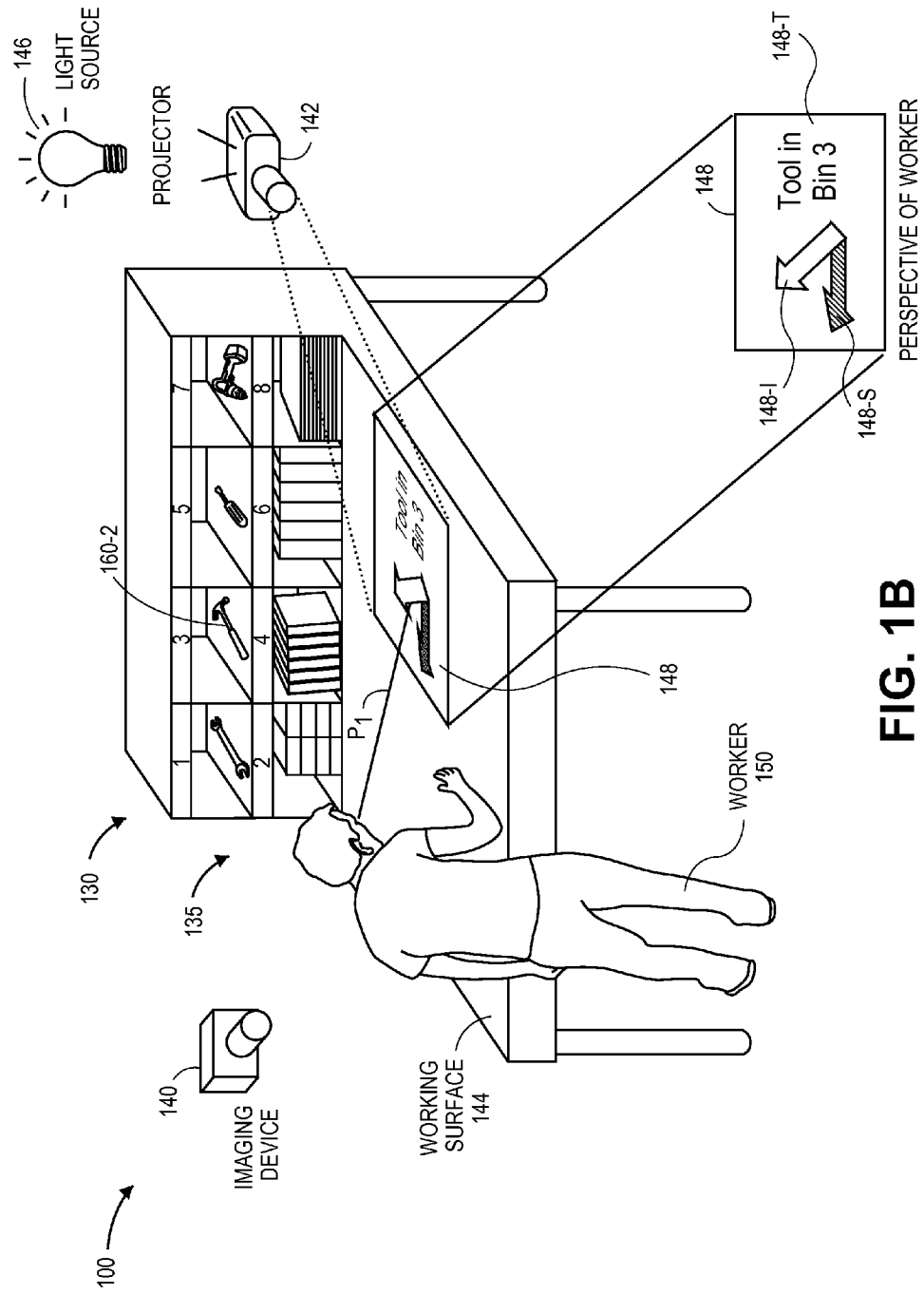

Referring to FIGS. 1A and 1B, a system 100 including a work center 130 and a worker 150 is shown. As is shown in FIG. 1A, the work center 130 includes a workstation 135 that is configured to store a plurality of tools 160-1, 160-2, 160-3, 160-4 and a plurality of materials 162-1, 162-2, 162-3, 162-4 or other objects therein. The workstation 135 further includes an imaging device 140, a projector 142, a working surface 144 and a light source 146. The imaging device 140 includes all or portions of the worker 150 and/or the workstation 135 within a field of view. The projector 142 is adjusted to project configurable light upon one or more portions of the workstation 135. The working surface 144 is provided for the worker 150 to perform any relevant operations, including operations requiring the use of one or more of the tools 160-1, 160-2, 160-3, 160-4 and/or one or more of the materials 162-1, 162-2, 162-3, 162-4 or other objects (not shown). The light source 146 may be a light bulb, a window or any other source of natural or artificial light. Alternatively, the light source 146 may be a virtual light source that is intended to emulate any natural or artificial light sources for the purpose of achieving one or more desired effects.

The present disclosure is directed to displaying perspective-aware projected user interfaces on one or more desired surfaces, such as the working surface 144 at the workstation 135 shown in FIG. 1A, in a manner or a relative perspective that is optimized for a position of one or more nearby workers, such as the worker 150 of FIG. 1A. Referring to FIG. 1B, the system 100 of FIG. 1A is shown, with a projection 148 of information presented on a portion of the working surface 144 by the projector 142. The projection 148 includes a projected indicator 148-I (viz., an arrow referencing a location of the tool 160-2), a projected depth element 148-S associated with the projected indicator 148-I and a projected set of text 148-T (viz., "Tool in Bin 3").

As is shown in FIG. 1B, the projection 148 is displayed in a manner that is consistent with a perspective $P_1$ of the worker 150, and which causes the projection 148 to appear readily visible by the worker 150 on the portion of the working surface 144 on which the projection 148 is provided. The location of the projection 148 on the working surface 144 may be selected based on the availability of space thereon or a relation to the information to be included in the projection 148, or on any other relevant factor.

Furthermore, as is shown in FIG. 1B, the projection 148 may be customized to include the projected depth element 148-S, a two-dimensional illumination or false shadow that synthesizes a three-dimensional view of at least some of the information included in the projection 148, e.g., the projected indicator 148-I provided thereon, from a vantage point of the user. For example, as is also shown in FIG. 1B, the projection 148 makes reference to the tool 160-2 provided in a portion of the workstation 135 by the projected indicator 148-I, and includes a depth element that has a substantially darker color than the projected indicator 148-I and is aligned in a manner with respect to the light source 146 that is specific to the portion of the workstation 135 in which the tool 160-2 is provided. By displaying the projected depth element 148-S in a position and configuration with respect to the projected indicator 148-I and the light source 146, the projected indicator 148-I appears in a simulated three-dimensional view on the working surface 144 from the perspective $P_1$ of the worker 150.

As is shown in FIG. 1B, the three-dimensionality of the projected indicator 148-I, provided by the projected depth element 148-S, aids the worker 150 in locating the tool 160-2 even if the worker 150 is not familiar with either the workstation 135 or the tool 160-2. Moreover, where the position of a head or eyes of the worker 150 changes, the location and/or orientation of the projection 148 may also change in order to remain clearly visible from a perspective of the worker 150 with his or her head or eyes in the new position. For example, when the worker 150 has moved from a first position to a second position within the workstation 135, the projected indicator 148-I may be caused to appear in the same location on the working surface 144, but the projected depth element 148-S may be repositioned and/or reconfigured such that the projected indicator 148-I appears in a three-dimensional manner from the perspective of the worker 150 in the second position, with respect to the light source 146.

Accordingly, the systems and methods disclosed herein may be used to project information onto selected locations of one or more working surfaces based on the perspective of a user or viewer who is intended to view and/or act upon the projected information and the positions of one or more sources of light, which may be physical (e.g., natural light from a single point such as the sun or a window through which sunlight may pass, or artificial light from a one or more points such as bulbs or other synthetic light emitters) or virtual (e.g., intended to emulate one or more physical light sources within an environment). The perspective of the user may be identified, and the locations onto which such information is to be projected may be selected, using information or data identified by an imaging device such as a range camera or depth sensor, or by any other known means in accordance with the present disclosure.

Computers are regularly used to present pertinent information to users who are performing one or more tasks. For example, computers may commonly be used to display recipes and/or lists of ingredients to chefs, diagnostic information or procedures to technicians at auto maintenance or repair facilities, installation methods or steps thereof to workers on assembly lines, or plans or schematics to workers and supervisors at construction sites using any type or form of display device. Such computers may be configured to display such information on one or more monitors or other computer displays in a hands-free manner that, unlike a book, a manual or another readable document, may be lofted above or mounted alongside an area in which a user is performing one or more tasks. Such monitors or computer displays may include, but are not limited to, cathode ray tube ("CRT") displays, light-emitting diode ("LED") or organic light-emitting diode ("OLED") displays, liquid crystal displays ("LCD"), or plasma displays that are mounted to a wall, ceiling or other structure in a vicinity of a workstation. Additionally, information from such computers may be provided in concert with one or more other computer devices or software applications for tracking the performance of such tasks, determining the status of the workstation or the identity of the worker, or for any other relevant purpose.

One such display device that may be used to present information regarding tasks, or any other relevant information or data, is a projector. Unlike a monitor or like display unit, which causes information or data to be displayed on a screen having a fixed location and fixed dimensions, a projector may present such information or data in the form of light that may be projected upon any surface in any number of locations, and with dimensions that may be adjusted based on the purpose for which such information or data is provided, or based on the surface onto which such information or data is to be projected.

Imaging devices such as digital cameras, range cameras or depth sensors operate by capturing light that is reflected from objects, and by subsequently calculating or assigning one or more quantitative values to aspects of the reflected light, e.g., pixels, generating an output based on such values, and storing such values in one or more data stores. For example, digital cameras may include one or more sensors having one or more filters associated therewith, and such sensors may detect information regarding aspects of any number of pixels of the reflected light corresponding to one or more base colors (e.g., red, green or blue) of the reflected light. Additionally, depth data or ranging data, e.g., a distance or depth to an object, may be captured from a depth sensor, a range camera or another like imaging device. Such devices may include infrared projectors for projecting infrared light onto one or more surfaces of an object and infrared sensors including arrays of pixel detectors for capturing digital imaging data regarding the wavelengths of the reflected light within different spectral bands, such as relatively lower frequency bands associated with infrared light, which may be projected upon an object in order to determine information regarding a distance to the object from which such light is reflected, or an orientation or configuration of the object. For example, the reflected light within the infrared bands may be processed in order to recognize a distance to the object, as well as one or more dimensions (e.g., heights, widths or lengths) of the object.

Sensors of imaging devices, such as digital cameras or depth sensors, may generate data files including such information, and store such data files in one or more onboard or accessible data stores (e.g., a hard drive or other like component), as well as one or more removable data stores (e.g., flash memory devices), or displayed on one or more broadcast or closed-circuit television networks, or over a computer network as the Internet. Data files that are stored in one or more data stores may be printed onto paper, presented on one or more computer displays, or subjected to one or more analyses, such as to identify items expressed therein.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, a digital camera may be configured in a fixed position, or with a fixed focal length (e.g., fixed-focus lenses) or angular orientation. Alternatively, an imaging device may include one or more motorized features for adjusting a position of the imaging device, or for adjusting either the focal length (e.g., zooming the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal axis or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Furthermore, some modern imaging devices may digitally or electronically adjust an image identified in a field of view, subject to one or more physical and operational constraints. For example, a digital camera may virtually stretch or condense the pixels of an image in order to focus or broaden the field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures or outlines of the features or objects, may be extracted from the data in any number of ways. For example, colors of pixels, or of groups of pixels, in a digital image may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Moreover, textures or features of objects expressed in a digital image may be identified using one or more computer-based methods, such as by identifying changes in intensities within regions or sectors of the image, or by defining areas of an image corresponding to specific surfaces.

Gestures, motions or other actions involving the movement of one or more body parts, such as the head, face, torso, arms or legs, may be tracked by a number of computer-based systems or methods. Some such systems or methods utilize imaging devices such as range cameras or depth sensors to determine the distance to or location of a human body and one or more extensions or body parts by calculating a duration of time during which light is projected from a sensor to an object and reflected thereby. Using the substantially constant speed of light, distances to the body and/or such extensions or parts may be calculated, and using such distances, a three-dimensional depth map of what is observed by the imaging device may be generated. Similarly, three-dimensional representations of an environment may be generated using two or more digital cameras in fixed orientations and relations to one another. Such representations may be generated using the respective outputs of each of the cameras in concert with one another.

Additionally, computer-based systems and methods may also track the positions and movements of a user's eyes. Such systems and methods may determine locations and orientations of the user's eyes and/or configurations of one or more objects within a scene of an environment based on imaging data captured from the scene or the environment, or from the eyes themselves, and may estimate the field of view at a given time using such data. For example, the movement of a pupil may be tracked using one or more reference spots or points of light projected upon specific portions of the eye, and the position and orientation of the pupil of the eye may be predicted based on light reflected from one or more of such spots or points. Alternatively, the position or movement of eyes may be estimated by determining a position or sensing movement of the head in which the eyes are provided. Because all eyes are provided on an upper anterior portion the face and head, a user's gaze may be predicted by determining an orientation or configuration of the user's face and head, and assuming a substantially perpendicular perspective projecting from the user's face.

Typically, humans may most clearly read and understand information or data that is presented in a plane that is substantially perpendicular to the perspective of one or both of their eyes. While such information or data may be read and understood by a user when such information or data is provided on surfaces that are not flat, or in planes that are not substantially perpendicular to the user's perspective, the information or data is typically less clear and less readily understood when presented in such planes or on oblique surfaces. However, projectors may be used to present information or data on a surface, e.g., the working surface 144 of the workstation 135 of FIGS. 1A and 1B, in a manner that may be readily read and understood by identifying a virtual plane between a user's eyes and the surface onto which the information or data is to be presented. The virtual plane may have shapes and dimensions that are selected based on the location of the user's eyes, the amount or type of information or data to be displayed, the distance to the surface onto which the information or data is to be presented, the purpose for which the information or data is to be used, or any other relevant factor.

Once the virtual plane has been identified, a projector may be configured to project the information or data upon the surface in a manner that causes the information or data to appear visible to the user within the virtual plane, at least substantially perpendicular to his or her perspective. More specifically, the projector may be programmed to present the information or data upon the surface in a warped or skewed manner, e.g., in one or more trapezoids or other sections, that corresponds to a presentation of the information or data in a desired manner, e.g., within a rectangle having a desired shape and size, in the virtual plane.

The systems and methods of the present disclosure are directed to providing projected user interfaces based on a perspective of the user for which such interfaces are intended to be read or interpreted. The interfaces may display one or more indicators (e.g., arrows, pointers, frames or the like), sets of alphanumeric characters (e.g., words, sentences, phrases, numbers or the like) or other projected elements of any type or form. Such systems and methods of the present disclosure may use one or more head-tracking or eye-tracking techniques to determine a location of a user's head or eyes and to determine his or her perspective thereby. Once the user's perspective has been identified and determined, the indicators, characters or other elements may be displayed on a two-dimensional surface in a manner that is apparently correct from a three-dimensional perspective of the user, with respect to one or more nearby sources of light, which may be physical or virtual in nature.

More specifically, the systems and methods disclosed herein display any information in a manner that provides a user with a sense of depth and three-dimensionality, e.g., by presenting the information with senses of not only length and width but also depth, and enriches the effectiveness of the information being provided. Some such information may include arrows, markers, text, characters, numbers or other indicators which may be projected onto a flat surface with shading, markings or other graphical enhancements which make such indicators appear to float or otherwise remain visible in a temporary, untethered manner or state with reference to one or more aspects of the flat surface or a station or location in which the surface is provided. For example, where an indicator is a digital arrow or like feature, a projector may cause the digital arrow to appear as if it is literally sticking out of or into a surface, and with one or more virtual shadows or other depth elements or features provided with respect to a location of one or more light sources, in order to identify or reference objects that are located above or below the surface.

The locations or orientations of the indicators or other information that is to be provided upon the flat surfaces of the present disclosure may be selected on any basis. For example, according to some embodiments of the present disclosure, such indicators or information may be presented with regard to a coordinate system defined by a vantage point of the user, e.g., an actual or estimated position of a user's eyes. The sizing and placement of such indicators or information may be determined in order to cause such indicators or information to appear within a virtual plane perpendicular to a perspective of the user and having a discrete distance from the user's eyes. As a result, despite the fact that the indicators or information are actually presented in a distorted fashion upon an oblique surface, the indicators or information appear correct and in a virtual plane within the perspective of the user. According to other embodiments of the present disclosure, the various elements of the indicators or information may be expressed differently based on a level of interactivity associated with one or more tools, materials or other objects with which the indicators or information is associated. For example, where information regarding steps of a process that are to be performed by a user is presented on a working surface, information regarding a step that is currently being performed or due may be shown in an enhanced manner or with two-dimensional features which provide a synthetic three-dimensional look and feel to the information regarding the step, such as a false shadow or other like element, which may be projected upon the working surface with respect to a location of one or more light sources, while information regarding other steps (e.g., steps that were previously performed or are not yet due) may be shown in an unenhanced manner or without such features.

Those of ordinary skill in the pertinent arts will recognize that indicators or other information may be displayed with three-dimensionality in an animated fashion, or with one or more cartoon-like features. For example, in order to distinguish an indicator, such as an arrow, that is projected upon a working surface from one or more aspects or surroundings of the working surface, the indicator may be displayed in the form of imperfect sketches or drawings, rather than with straight lines or specially formed curves, or with characters in a casual font such as Comic Sans, which may cause the indicator to appear as a caricature or in a satirical manner. Likewise, an indicator may be displayed in a manner that evokes humor or sarcasm. Specially selected text or other characters (e.g., "Hey! Look over here!" or "It's under the desk, silly.") may be provided alongside indicators that are displayed in such a manner.

Those of ordinary skill in the pertinent arts will also recognize that displaying an indicator or other feature with three-dimensionality using one or more projectors may be accomplished in any number of ways. For example, as is discussed above, one or more false shadows or other depth elements may be displayed in conjunction with, or in association with, one or more indicators or other information (e.g., arrows, symbols, alphanumeric characters) upon a surface in a manner that causes such indicators or information to appear in a three-dimensional manner from a perspective of a user. Such false shadows or other depth elements may comprise projections or illuminations in colors that are substantially darker than the indicators or other information with which they are associated, in order to cause the indicators or information to appear as if illuminated by an actual light source within a workstation or other environment, or a virtual light source intended to achieve a desired effect within the environment.

Alternatively, displaying indicators or other information with three-dimensionality may be accomplished by including one or more synthetic specularities or points of specular reflection upon such indicators or information. Specular reflection is a photographic phenomenon that occurs when light is reflected from a particularly smooth surface, and results in a concentration of reflected light at one or more points of a subject. Therefore, an arrow or other indicator may include a small and substantially white portion that simulates a mirror-like reflection of light from an actual light source within a workstation or other environment at a position corresponding to a simulated point of reflection. Further, when a position of a user's head or eyes changes, indicators or other information may be displayed with three-dimensionality by simulating parallax, or a displacement or difference in appearances of the indicators or information as represented by a finite angle between such appearances. The indicators or information may thus appear to move as a user changes a position of his or her head or eyes, where an angle or alignment of the indicators or the information may twist, pivot or translate with respect to such changes in position, or appear to be accompanied by one or more effects of parallax.

In some embodiments, the information displayed on one surface (e.g., a desk or table top within a working area or at a workstation) may include a representation of any tools, materials or other objects on another side of the surface. For example, in addition to a projection of an indicator which references a location of a desired tool, material or other object beneath a surface, along with any two-dimensional depth elements or other visible features that synthesize a three-dimensional view of the surface, the projection may further include an actual or simulated image simulating the locations of tools, materials or other objects beneath the surface, including but not limited to the desired tool, material or other object, thereby providing a real or conceptual account of the arrangement of such tools, materials or objects that is invisible or at least partially obscured to the user and beneath the surface, in addition to an indicator referencing the location of the desired tool, material or other object.

Accordingly, some embodiments of the present disclosure may determine a position of a head and/or eyes of a user at a workstation, thereby defining a vantage point of the user, and generate a perspective of the user from the vantage point. The position of the head or eyes may be actual or estimated, and may be determined by any head-tracking or eye-tracking means in accordance with the present disclosure. For example, a position of a user's head may be determined by generating a depth profile or range information from imaging data captured from an imaging device such as a depth sensor or range camera. A position of the user's eyes may be approximated, and the vantage point of the user may be defined, based on the position of the user's head. Alternatively, positions of one or more of the user's eyes may be determined directly, e.g., by one or more eye-tracking methods.

Next, the physical locations of the various elements or other features at the workstation, including a working surface and one or more tools, materials or other objects, may be determined. For example, a depth profile or a set of range information from which a location of a user's head or eyes is determined, or another depth profile or another set of range information, may be evaluated to determine the locations of elements or features of the workstation. The locations of the tools, materials or other objects may be identified by resort to a look-up table or other record maintained in a database or other data store, as well.

Where information regarding a task to be performed at the workstation is to be presented to the user, e.g., upon the working surface, a location on the working surface may be selected for the presentation of the information based on the availability of space on the working surface. Such information is preferably presented on a flat surface, rather than a curved or faceted surface. Once the location on the working surface has been selected, the manner in which the information is to be rendered may be selected based on a perspective of the user and his or her vantage point. For example, as is shown in FIG. 1B, where the information to be presented includes an indicator (e.g., an arrow) or alphanumeric characters (e.g., text or numbers), an orientation of the indicator or the characters may be selected, and an appropriate false shadow or other like element may be projected upon a working surface in a location which causes the indicator or the characters to appear in a three-dimensional manner to the user, and in an orientation or configuration selected based on a position of one or more physical or virtual light sources. The position of the head and/or eyes of the user may be continuously and/or regularly tracked such that the location and/or presentation of the indicator or the characters may be updated based on changes in the user's perspective.

Figure 2:
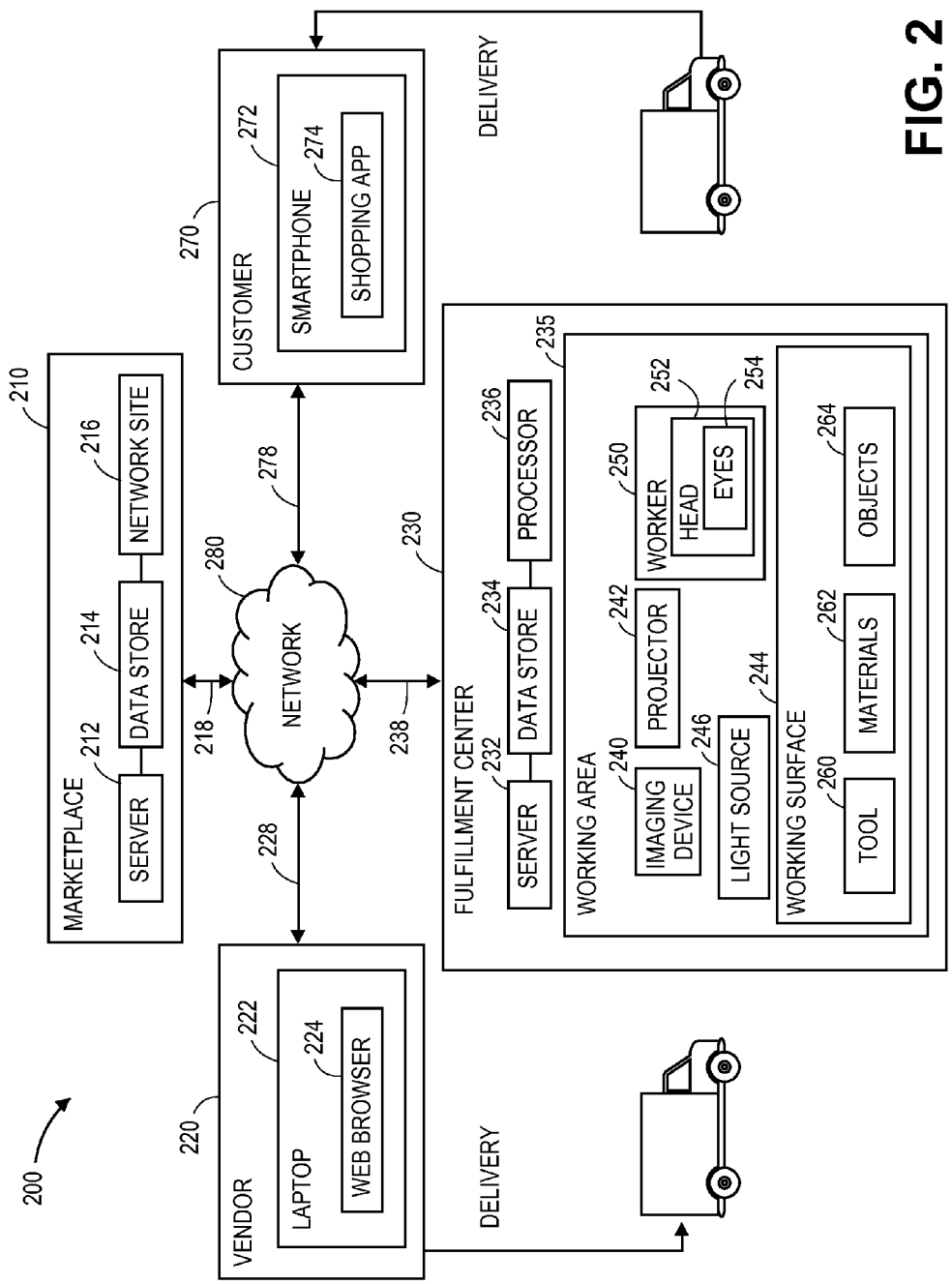
FIG. 2 is a block diagram of components of one system for displaying perspective-aware projected user interfaces in accordance with embodiments of the present disclosure.

Referring to FIG. 2, a block diagram of components of one system 200 for displaying perspective-aware projected user interfaces in accordance with embodiments of the present disclosure is shown. The system 200 includes a marketplace 210, a vendor 220, a fulfillment center 230 and a customer 270 that are connected to one another across a network 280, such as the Internet.

The marketplace 210 may be any entity or individual that wishes to make items from a variety of sources available for download, purchase, rent, lease or borrowing by customers using a networked computer infrastructure, including one or more physical computer servers 212 and data stores (e.g., databases) 214 for hosting a network site 216. The marketplace 210 may be physically or virtually associated with one or more storage or distribution facilities, such as the fulfillment center 230. The network site 216 may be implemented using the one or more servers 212, which connect or otherwise communicate with the one or more data stores 214 as well as the network 280, as indicated by line 218, through the sending and receiving of digital data. Moreover, the data stores 214 may contain any type of information regarding items that have been made available for sale through the marketplace 210, or ordered by customers from the marketplace 210.

The vendor 220 may be any entity or individual that wishes to make one or more items available to customers, such as the customer 270, by way of the marketplace 210. The vendor 220 may operate one or more order processing and/or communication systems using a computing device such as a laptop computer 222 and/or software applications such as a web browser 224, which may be implemented through one or more computing machines that may be connected to the network 280, as is indicated by line 228, in order to transmit or receive information regarding one or more items to be made available at the marketplace 210, in the form of digital or analog data, or for any other purpose.

The vendor 220 may deliver one or more items to one or more designated facilities maintained by or on behalf of the marketplace 210, such as the fulfillment center 230. Additionally, the vendor 220 may receive one or more items from other vendors, manufacturers or sellers (not shown), and may deliver one or more of such items to locations designated by the marketplace 210, such as the fulfillment center 230, for fulfillment and distribution to customers. Furthermore, the vendor 220 may perform multiple functions. For example, the vendor 220 may also be a manufacturer and/or a seller of one or more other items, and may offer items for purchase by customers at venues (not shown) other than the marketplace 210. Additionally, items that are made available at the marketplace 210 or ordered therefrom by customers may be made by or obtained from one or more third party sources, other than the vendor 220, or from any other source (not shown). Moreover, the marketplace 210 itself may be a vendor, a seller or a manufacturer.

The fulfillment center 230 may be any facility that is adapted to receive, store, process and/or distribute items. As is shown in FIG. 2, the fulfillment center 230 includes a networked computer infrastructure for performing various computer-related functions associated with the receipt, storage, processing and distribution of such items, including one or more physical computer servers 232, databases (or other data stores) 234 and processors 236. The fulfillment center 230 may also include stations for receiving, storing and distributing items to customers, such as one or more receiving stations, storage areas and distribution stations. The fulfillment center 230 further includes a working area 235 (or workstation) having one or more imaging devices 240, one or more projectors 242, one or more working surfaces 244, one or more light sources 246 and one or more workers 250.

The imaging device 240 may comprise any form of optical recording device that may be used to photograph or otherwise record imaging data regarding the various structures, facilities or other elements within the fulfillment center 230, as well as the items within the fulfillment center 230, or for any other purpose. The imaging device 240 may capture one or more still or moving images, or like imaging data (e.g., depth or heat information or data) as well as any relevant audio signals or other information, within one or more designated locations within the fulfillment center 230, and may be connected to the server 232 or with one another by way of an internal network (not shown). Additionally, the imaging device 240 and other devices within the fulfillment center 230 may be adapted or otherwise configured to communicate with one another, or with the marketplace 210 or the marketplace server 212, the vendor 220 or the vendor laptop 222 or the customer 270 or customer smartphone 272, or to access one or more other computer devices by way of the external network 280. Although the working area 235 of FIG. 2 includes a single imaging device 240, any number or type of imaging devices may be provided in accordance with the present disclosure, including but not limited to digital cameras or other optical sensors.

The projector 242 may be configured to generate and project an image onto one or more surfaces, such as a surface of or near a workstation associated with the preparation of one or more items for delivery, e.g., the working surface 244 at the working area 235 of the fulfillment center 230. The projector 242 may be configured to generate and/or project full color or black and white single images or, alternatively, full motion video images based on information received from one or more computer devices, such as the server 212, the laptop 222, the server 232 or the smartphone 272, or any other computer devices that may be utilized or provided within the fulfillment center 230 or the working area 235 (not shown) or otherwise accessible over the network 280. The projector 242 may comprise a liquid crystal display ("LCD") projector, a liquid crystal on silicon ("LCOS") projector, a digital light processing ("DLP") projector, a cathode ray tube ("CRT") projector, a laser projector, a laser scanning projector, a digital micromirror device, or other like devices for projecting one or more images. The projector 242 may be provided alongside or within a vicinity of the imaging device 240, and with a similar orientation, or may, alternatively, be provided as a discrete component with no relation to the imaging device 240 or with a unique orientation.

The working surface 244 may be a table, a desk, a platform, an easel or any other surface upon which one or more tasks associated with the execution of a task may be performed. The working surface 244 may be consistently planar, or may be formed with one or more breaks or one or more curved portions or sections. As is shown in FIG. 2, the working surface 244 may have one or more tools 260 or other implements, one or more materials 262 or other supplies or one or more 264 objects of any type, kind or form provided thereon, or one or more other articles or other matter (not shown).

The light source 246 may include one or more individual physical or virtual sources of natural or artificial light. For example, the light source 246 may be one or more light bulbs or other light-emitting devices, e.g., incandescent light bulbs, fluorescent light bulbs (linear or compact), halogen light bulbs or LEDs. Alternatively, the light source 246 may include natural light provided by the sun or one or more other celestial sources, e.g., light reflected from the moon or one or more planets, or beamed from one or more stars other than the sun, as well as one or more means for providing or channeling such natural light, including windows, skylights, portholes or other openings through which light may pass. The light source 246 may further be one or more virtual lights or virtual light sources that may emulate one or more physical lights in the working area 235, and may be placed and parameterized in order to achieve a desired effect.

The fulfillment center 230 may further include one or more workers 250 or staff members within the working area 235 who may handle or transport items or conduct any other relevant operations within the working area 235 or the fulfillment center 230. The worker 250 may include a head 252 and eyes 254, and may operate one or more computing devices or machines for registering the receipt, retrieval, transportation or storage of items within the fulfillment center, e.g., a general purpose device such a personal digital assistant, a digital media player, a smartphone, a tablet computer, a desktop computer or a laptop computer, which may include any form of input and/or output peripherals such as scanners, readers, keyboards, keypads, touchscreens or like devices. Additionally, the worker 250 may handle or transport items within the working area 235, such as by removing the items from a car, truck, ship or aircraft, placing the items onto a crane, jack, belt or another conveying apparatus at a receiving station, transporting the items to a shelf, bin, rack, tier, bar, hook or other storage means within a storage area, retrieving the items from such a storage means within the storage area, transporting the items to a defined region within a distribution station, and preparing the items for delivery to one or more customers. Alternatively, the worker 250 may also transport, or "cross-dock," items directly from a receiving station to a distribution station.

The tool 260 may be any type or number of implements for performing any number of actions with regard to the execution of one or more tasks at the workstation 235. For example, in a fulfillment center environment, the tools 260 may include any number of cutting implements for slicing open boxes or packages, adhesives for sealing boxes or packages, scanners or readers for optically recognizing one or more markings (e.g., bar codes and the like). Alternatively, the tools 260 may include any other static or dynamic tools that may be required based on general or specific criteria for executing one or more actions associated with a task to be performed within a given environment, including but not limited to hammers, screwdrivers, drills, sanders, or wrenches, or any other type of tool.

The materials 262 may be any type or number of supplies, parts or raw materials required for the performance of one or more actions with regard to the execution of one or more tasks at the workstation 235. In a fulfillment center environment, the materials 262 may include containers (e.g., boxes, envelopes, tubes or bags), dunnage (e.g., paper, plastic, foam materials or "bubble wrap"), labels (e.g., address labels, shipping labels or postage labels such as stamps) or any other accessories required in order to prepare an item for delivery, including but not limited to adhesive tapes, glues, sealants or the like. Alternatively, the materials 262 may include any other materials that may be required based on general or specific criteria for executing one or more actions associated with a task to be performed within a given environment, including but not limited to hammers, screwdrivers, drills, sanders, or wrenches, or any other type of tool.

The objects 264 may be any items, structural features, facilities, vehicles, implements, surfaces, pieces of equipment or any other objects in addition to the tools 260 or the materials 262 within the working area 235. For example, referring again to the work center 130 of FIG. 1A, the objects 264 may include one or more components of the workstation 135, or any other environment. The objects 264 may have any size, shape, mass, volume, surface area, texture, color, reflectance, silhouette, surface contour or variations, or any other qualities in accordance with the present disclosure, and may be provided for a general purpose, or for one or more specific purposes.

The fulfillment center 230 may further operate one or more order processing and/or communication systems using computer devices in communication with one or more of the server 232, the database 234 and/or the processor 236, or through one or more other computing devices or machines that may be connected to the network 280, as is indicated by line 238, in order to transmit or receive information in the form of digital or analog data, or for any other purpose. Such computer devices may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices may be general purpose devices or machines, or dedicated devices or machines that feature any form of input and/or output peripherals such as scanners, readers, keyboards, keypads, touchscreens or like devices, and may further operate or provide access to one or more engines for analyzing the information or data regarding the workflow operations, or the interactions received from the one or more operators, users or workers.

Additionally, as is discussed above, the fulfillment center 230 may include one or more receiving stations featuring any apparatuses that may be required in order to receive shipments of items at the fulfillment center 230 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e g, manned aircraft or unmanned aircraft, such as drones), and preparing such items for storage or distribution to customers. The fulfillment center 230 may also include one or more predefined two-dimensional or three-dimensional storage areas including facilities for accommodating items and/or containers of such items, such as aisles, rows, bays, shelves, slots, bins, racks, tiers, bars, hooks, cubbies or other like storage means, or any other appropriate regions or stations. The fulfillment center 230 may further include one or more distribution stations where items that have been retrieved from a designated storage area may be evaluated, prepared and packed for delivery from the fulfillment center 230 to addresses, locations or destinations specified by customers, also by way of carriers such as cars, trucks, trailers, freight cars, container ships or cargo aircraft (e g, manned aircraft or unmanned aircraft, such as drones).

Moreover, the fulfillment center 230 may further include one or more control systems that may generate instructions for conducting operations at the fulfillment center 230, and may be in communication with the imaging device 240, the projector 242, the worker 250 or one or more of the tools 260, the materials 262 or the objects 264. Such control systems may also be associated with one or more other computing devices or machines, and may communicate with the marketplace 210, the vendor 220, the worker 250 or the customer 270 over the network 280, as indicated by line 238, through the sending and receiving of digital data.

The customer 270 may be any entity or individual that wishes to download, purchase, rent, lease, borrow or otherwise obtain items (e.g., goods, products, services or information of any type or form) from the marketplace 210. The customer 270 may utilize one or more computing devices, such as a smartphone 272 or any other like machine that may operate or access one or more software applications, such as a web browser (not shown) or a shopping application 274, and may be connected to or otherwise communicate with the marketplace 210, the vendor 220 or the fulfillment center 230 through the network 280, as indicated by line 278, by the transmission and receipt of digital data. Moreover, the customer 270 may also receive deliveries or shipments of one or more items from facilities maintained by or on behalf of the marketplace 210, such as the fulfillment center 230, or from the vendor 220.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "vendor," a "fulfillment center," a "worker" or a "customer," or like terms, may be automated steps performed by their respective computer systems, or implemented within software modules (or computer programs) executed by one or more general purpose computers. Moreover, process steps described as being performed by a "marketplace," a "vendor," a "fulfillment center," a "worker" or a "customer" may be typically performed by a human operator, but could, alternatively, be performed by an automated agent.

The marketplace 210, the vendor 220, the fulfillment center 230 and/or the customer 270 may use any web-enabled or Internet applications or features, or any other client-server applications or features including E-mail or other messaging techniques, to connect to the network 280 or to communicate with one another, such as through short or multimedia messaging service (SMS or MMS) text messages. For example, the server 232 may be adapted to transmit information or data in the form of synchronous or asynchronous messages from the fulfillment center 230 to the server 212, the laptop computer 222, the smartphone 272 or any other computer device in real time or in near-real time, or in one or more offline processes, via the network 280. Those of ordinary skill in the pertinent art would recognize that the marketplace 210, the vendor 220, the fulfillment center 230 or the customer 270 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the server 212, the laptop computer 222, the server 232 or the smartphone 272, or any other computers or control systems utilized by the marketplace 210, the vendor 220, the fulfillment center 230 or the customer 270 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Although some of the embodiments disclosed herein reference the use of projectors for presenting projections including identifiers in apparent two-dimensional and/or three-dimensional orientations onto working surfaces within a fulfillment center, such as the projector 242, the working surface 244 within the working area 235 of FIG. 2 or another fulfillment center environment, those of ordinary skill in the pertinent arts will recognize that the systems and methods are not so limited. Rather, the systems and methods disclosed herein may be utilized in any environment in which the presenting information or data, which need not include any specific type or form of identifier, onto one or more surfaces.

Figure 3:
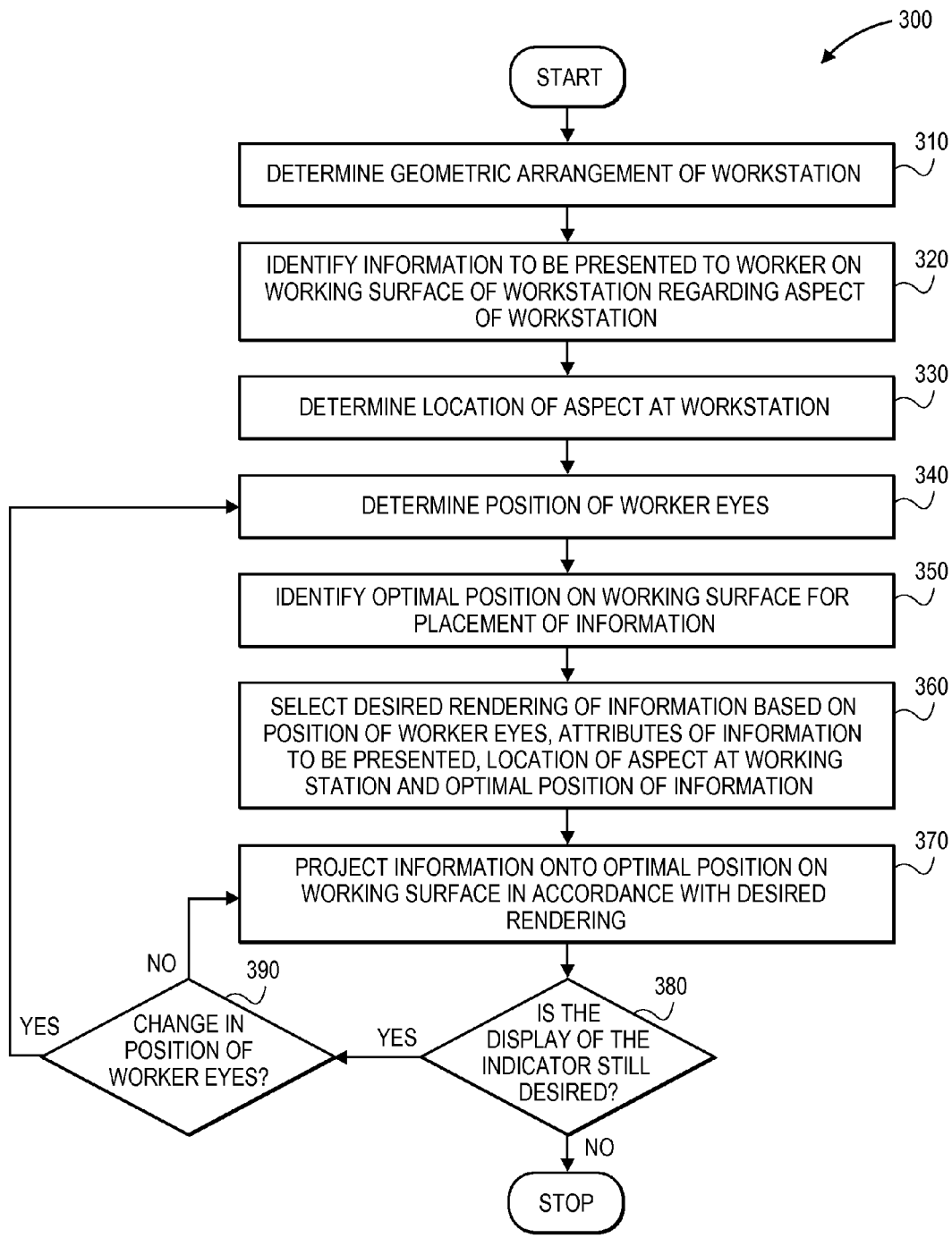
FIG. 3 is a flow chart of one process for displaying perspective-aware projected user interfaces in accordance with embodiments of the present disclosure.

As is discussed above, the systems and methods of the present disclosure may be directed to projecting one or more perspective aware user interfaces onto a working surface of a workstation. Referring to FIG. 3, a flow chart 300 representing one embodiment of a process for displaying perspective-aware projected user interfaces in accordance with embodiments of the present disclosure is shown. At box 310, a geometric arrangement of the workstation is determined. For example, a depth profile of the workstation and any components or features therein may be obtained using an imaging device such as a depth sensor or a range camera, and the layout or configuration of the various components or features within the workstation (e.g., the respective positions of such components or features within three-dimensional space) may be determined from the depth profile.

At box 320, information that is to be presented to the worker on a working surface of the workstation regarding an aspect of the workstation is identified. For example, where the worker is charged with performing a specific task (e.g., retrieving an item from a container included in an inbound shipment, or packing the item into a container to be included in an outbound shipment, information regarding the item, the container, a source of the item or the container, a recipient of the item or container, or any other contents of the inbound shipment container or any dunnage or other items to be included in the outbound shipment container may be identified. The type of information that is to be presented to workers on working surfaces of the present disclosure is not limited.

At box 330, a location of the aspect relating to the information identified at box 330 is determined. The aspect may include a tool, a material or any other relevant object associated with the workstation, and the location may be an area on a shelf or within a slot, a portion of a working surface, or a region below the working surface, or any other location within the workstation, in accordance with the present disclosure.

At box 340, the position of a worker's eyes may be determined. An actual or an estimated position of the eyes may be determined on any basis, such as by one or more eye-tracking techniques or, alternatively, by identifying a position of the worker's head and estimating that his or her eyes are provided on an upper anterior portion of the head. The position of the eyes may define a vantage point of the worker, and may be used to further define a perspective of the user with respect to one or more portions of the workstation.

At box 350, an optimal position for the placement of the information on the working surface is identified. The optimal position may be identified based on a position of the worker, a location of the aspect, one or more characteristics of the aspect (e.g., an intended use of a tool, a size of a portion of material, or a type of object), as well as any steps of a process or method that are to be performed prior to or after placing the information on the working surface. For example, where one or more objects are known to be resting on the working surface, e.g., based on a depth profile used to determine the geographical arrangement of the workstation at box 310 or a position of the worker's eyes at box 320, the optimal position may be determined based on the respective positions of such objects on the working surface. Additionally, where the information regarding the aspect involves the execution of a task, the optimal position may be selected based on one or more steps preceding or following the presentation of the information, particularly where one or more of such steps would require the use of dedicated portions of the working surface.

At box 360, a desired rendering of the information is selected based at least in part on the position of the worker's eyes, the attributes of the information to be presented, the location of the aspect at the workstation or the optimal position identified at box 350. The rendering may be selected according to a vantage point or perspective of the worker, as determined from the position of the worker's eyes determined at box 310, or on any other basis. Where the information includes an indicator such as an arrow or other element referencing the aspect or one or more features of the workstation, the desired rendering may include a false shadow or other representation associated with the arrow or other element which causes the arrow or other element to appear in a three-dimensional manner from the vantage point or the perspective of the user. The locations of the false shadows or other representations may be defined with respect to the arrow or the other element, and the vantage point or perspective of the user, as well as the available area on the working surface and any other relevant intrinsic or extrinsic factor.

At box 370, the information is projected onto the optimal position on the working surface in accordance with the desired rendering. A projector, such as the projector 142 provided in the work center 130 of the system 100 of FIG. 1A and FIG. 1B, may cause such information to be projected upon the optimal location in a specific manner which causes the information to appear in a desired format to the worker, e.g., within a virtual plane perpendicular to the perspective of the user. For example, where information is to appear as a desired rectangle to the worker, a projector may cause the information to appear on the working surface in the shape of a trapezoid or other sector having points, angles and dimensions selected on a geometric basis for the express purpose of causing the information to appear in the shape of the desired rectangle. Additionally, where the information includes an arrow or other indicator, projecting the information in accordance with the desired rendering may appropriately place the indicator and any false shadows or other elements in locations which cause the indicator to appear in a three-dimensional fashion to the worker.

At box 380, if the display of the information is no longer desired, the process ends. If the continued display of the information is desired, however, then the process advances to box 390, where it is determined whether a position of the worker's eyes has changed. For example, where an actual position of the worker's eyes is determined based on the locations of one or more reference spots or points of light projected upon specific portions of the eyes according to one or more eye-tracking techniques, changes in the actual position may be determined based on changes in the reflection of light from one or more portions of the eye, e.g., the pupil. Where an estimated position of the worker's eyes is determined based on an actual position of the worker's head as determined by any means, e.g., a depth profile obtained using an imaging device such as a range camera or depth sensor, however, a change in the position of the worker's head may be interpreted as being accompanied by a corresponding change in the position of the worker's eyes.

If the position of the worker's eyes has changed then the process returns to box 320, where the new position of the worker's eyes is determined. If the position of the worker's eyes has not changed, then the process returns to box 370, where the information remains projected onto the optimal position on the working surface in accordance with the desired rendering, until the display of the indicator is no longer desired.

Figure 4A:
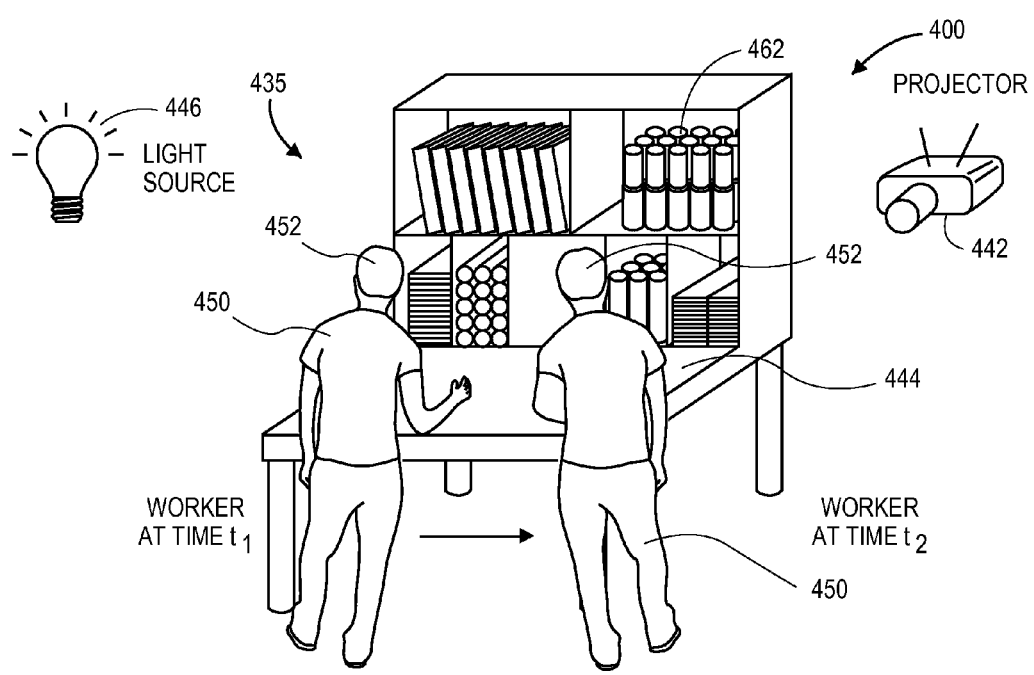
FIGS. 4A, 4B and 4C are views of aspects of one system for displaying perspective-aware projected user interfaces in accordance with embodiments of the present disclosure.
Figure 4B:
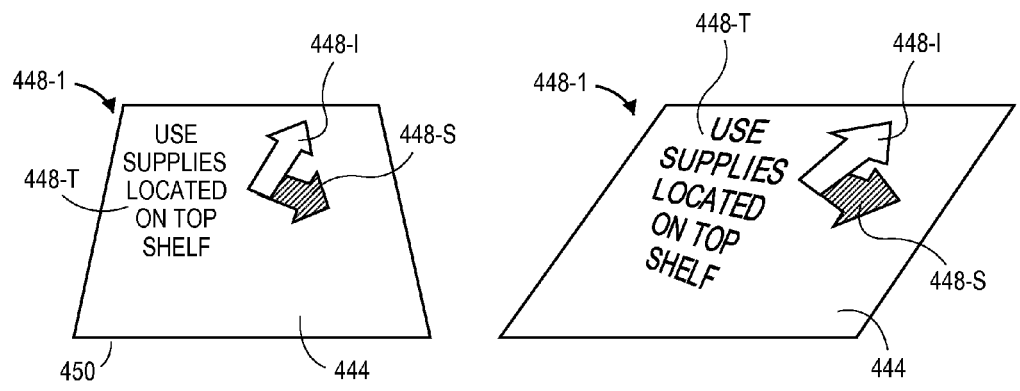
Figure 4C:
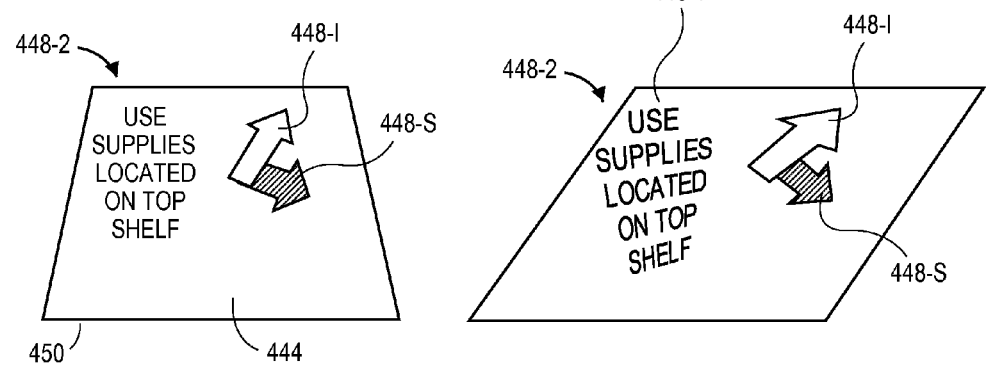

As is discussed above, a change in a position of a worker's head or eyes may lead to a change in a preferred or desired rendering of an indicator or other relevant information on a working surface, as the new position of the head or the eyes may call for a better or more appropriate optimal position for the information, or a more appropriate rendering of such information in a manner that best accentuates a message to be conveyed by such information, or presents such information in a more favorable manner to users. Based on the change in the position of the worker's head or eyes, the manner in which the information is rendered by the projector may require changing, in order to ensure that the information may be viewed by the user in the desired manner from his or her new perspective. Referring to FIGS. 4A, 4B and 4C, views of aspects of one system 400 for displaying perspective-aware projected user interfaces in accordance with embodiments of the present disclosure are shown. Except where otherwise noted, reference numerals preceded by the number "4" shown in FIG. 4A, 4B or 4C indicate components or features that are similar to components or features having reference numerals preceded by the number "1" shown in the system 100 of FIGS. 1A and 1B.

As is shown in FIG. 4A, the system 400 includes a workstation 435 having a projector 442, a working surface 444 and a light source 446. A worker 450 having a head 452 is shown in different positions with respect to the workstation 435 and the working surface 444 at two different times $t_1$, $t_2$.

In accordance with the present disclosure, a change in a position of a user's head and/or eyes may result in a different optimal or preferred location for an indicator or other information to be projected upon a working surface, or a different optimal or preferred rendering for presenting the indicator or other information in an enhanced context, e.g., with one or more false shadows or other depth elements which cause the indicator or other information to appear in a three-dimensional manner from the changed vantage point or perspective of the user. Referring to FIGS. 4B and 4C, projections 448-1 and 448-2 presented on the working surface 444 at times $t_1$ and $t_2$, respectively, are shown. As is shown in FIG. 4B, the projection 448-1 includes a projected indicator 448-I, a projected false shadow 448-S and a projected set of text 448-T at time $t_1$. As is shown in FIG. 4C, the projection 448-2 also includes the projected indicator 448-I, the projected false shadow 448-S and the projected set of text 448-T at time $t_2$.

Referring to FIG. 4B, from a perspective of the worker 450 at time $t_1$, the projected indicator 448-I shown in the projection 448-1 is angled upward from a center of the working surface 444 from left to right, toward the supplies 462 shown in FIG. 4A. Also from the perspective of the worker 450 at time $t_1$, the projected false shadow 448-S is angled substantially downward and slightly to the right, based on the position of the light source 446, which causes the projected indicator 448-I to appear in a three-dimensional configuration to the worker 450 in his or her position at time $t_1$. Additionally, the projected set of text 448-T is shown in an upper left portion of the working surface 444, in an easy-to-read format from the vantage point or perspective of the worker 450 at time $t_1$.

In order to cause the projected indicator 448-I to appear in the three-dimensional configuration to the worker 450 in his or her position at time $t_1$, the projection 448-1 must be distorted such that aspects of the projected indicator 448-I, the projected false shadow 448-S and the projected set of text 448-T appear narrower nearest a left edge of the working surface 444, e.g., an edge closest to the worker 150 at time $t_1$, and broader away from the left edge of the working surface 444, as viewed from a perspective of a third party or another stationary point at time $t_1$. Rather, the projection 448-1 at time $t_1$ is specifically selected to present the projected indicator 448-I and the projected set of text 448-T to the worker 150 from his or her perspective, defined by a three-dimensional position of his or her eyes at time $t_1$. Furthermore, the placement of the projected false shadow 448-S on the working surface 444 at time $t_1$ is further selected to cause the projected indicator 448-I to appear with three-dimensionality based on the position of the eyes of the worker at time $t_1$ and the position of the light source 446.

Referring to FIG. 4C, the projection 448-2 at time $t_2$ also includes the projected indicator 448-I, the projected false shadow 448-S and the projected set of text 448-T. The projected indicator 448-I shown in the projection 448-2 of FIG. 4C is also angled upward from the center of the working surface 444 from left to right, toward the supplies 462 shown in FIG. 4A, in a substantially identical location and with substantially identical three-dimensionality of the projected indicator 448-I shown in the projection 448-1 at time $t_1$ based on the location of the projected false shadow 448-S, as viewed from the perspective of the worker 450 at time $t_2$.

However, in order to cause the projected indicator 448-I to appear in the same three-dimensional configuration to the worker 450 in his or her position at time $t_2$ as at time $t_1$, the projection 448-2 onto the working surface must be distorted, from the perspective of a third party, in a manner that differs from the projection 448-1. For example, referring to FIG. 4C, aspects of the projected indicator 448-I, the projected false shadow 448-S and the projected set of text 448-T appear broader nearest the left edge of the working surface 444, e.g., an edge farthest from the worker 150 at time $t_2$, and narrower away from the left edge of the working surface 444, from a perspective of a third party at time $t_2$. Rather, the projection 448-2 at time $t_2$ is specifically selected to present the projected indicator 448-I and the projected set of text 448-T to the worker 150 from his or her perspective, defined by a three-dimensional position of his or her eyes at time $t_2$. Furthermore, the placement of the projected false shadow 448-S on the working surface 444 at time $t_2$ is further selected to cause the projected indicator 448-I to appear with three-dimensionality based on the position of the eyes of the worker at time $t_2$ and the position of the light source 446.

Accordingly, the systems and methods of the present disclosure may reposition or reconfigure information presented by a projector onto one or more portions of a working surface based on a position of a user, such as the worker 450 of FIGS. 4A-4C, in a manner that enhances the presentation of the information from the vantage point or perspective of the user. For example, as is shown in FIGS. 4B and 4C, distorting the projections 448-1, 448-2 in different manners at time $t_1$ and time $t_2$ causes the projected indicator 448-I and the projected set of text 448-T to appear consistently from the perspectives of the worker 150 at time $t_1$ and time $t_2$, despite his or her change in position. Likewise, distorting the projected set of text 448-T enables the worker 450 to most easily read and understand the message conveyed thereby in a consistent manner regardless of his or her position.

As is discussed above, the systems and methods of the present disclosure may be used to present information regarding one or more steps to be performed when completing a task or set of tasks. The information presented may be shown in a serial manner, such that indicators, characters or other information are presented differently based on the respective actions or activities required to perform each task. For example, where a process includes two steps requiring the use of a first tool and a second tool, respectively, a first arrow or other indicator may be displayed to the user in order to reference a location of the first tool before a second arrow or other indicator is displayed to the user in order to reference a location of the second tool. The first arrow or other indicator may be presented in a three-dimensional manner, e.g., with one or more false shadows or like elements, which causes the first arrow to appear as if it is floating or otherwise superimposed above a working surface. The second arrow or other indicator may be subsequently presented in a different three-dimensional manner, with one or more other false shadows or other like elements, as well.

Figure 5:
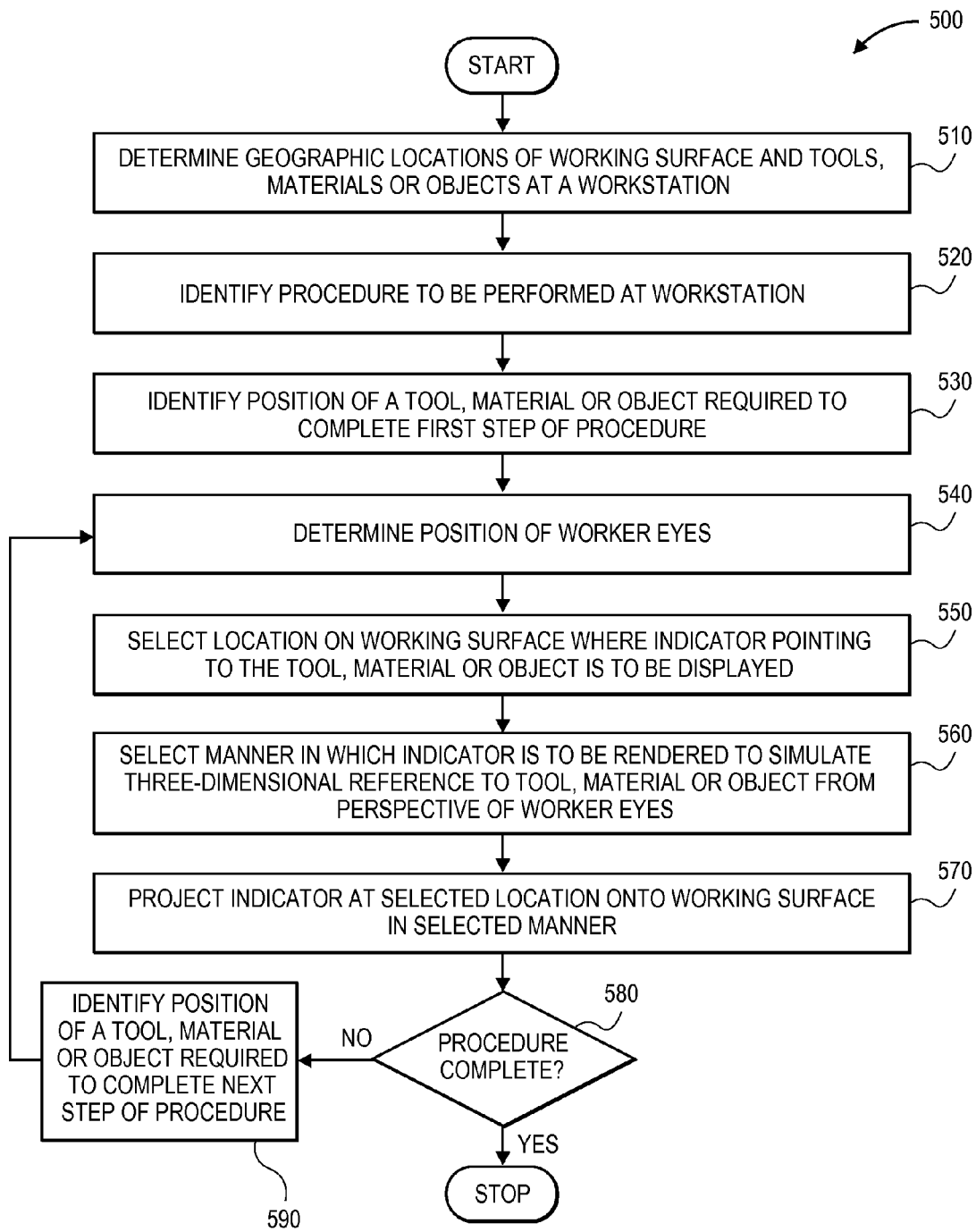
FIG. 5 is a flow chart of one process for displaying perspective-aware projected user interfaces in accordance with embodiments of the present disclosure.

Referring to FIG. 5, a flow chart 500 representing one embodiment of a process for displaying perspective-aware projected user interfaces in accordance with embodiments of the present disclosure is shown. At box 510, the physical locations of a working surface and tools, materials or objects at a workstation are determined. The working surface may be a table, a desk, a platform, an easel or any other surface upon which any type or actions or activities may be undertaken in furtherance of a task. At box 520, a procedure to be performed at the workstation is identified. For example, where the workstation or working surface is associated with a machine shop, a type of maintenance evolution to be performed on an automobile alternator may be identified. Where the workstation or working surface is associated with a carpenter's shop, a procedure for constructing a birdhouse may be identified.

At box 530, a position of a tool, a material or an object (e.g., implements, ingredients, spare parts) required to complete a first step of the procedure identified at box 520 is identified. The tool, the material or the object may be located on a shelf, in a drawer, behind a door, within a locker, below a countertop or in any other location within a vicinity of the workstation and/or the working surface. At box 540, a position of the worker's eyes is determined. The position may be determined in real-time or in near-real time using one or more eye-tracking techniques or methods, or estimated based on a position of the worker's head.

At box 550, a location on the working surface where an indicator pointing to the tool, the material or the object is to be displayed is selected. The location may be selected on any basis, including the extent of the space not occupied by one or more tools, materials or other objects on the working surface, the position of the tool, the material or the object identified at box 530, or any relevant requirements associated with a given step of the procedure. At box 560, a manner for rendering the indicator to simulate a three-dimensional reference to the location of the tool, the material or the object from a perspective of the worker's eyes is selected. The manner may include not only an extent or location of a false shadow or other like element for enhancing the three-dimensional appearance of the indicator but also a color, shape, size, type or other attribute of the indicator, which may be selected in any manner or on any basis to accentuate the appearance of the indicator on the working surface. For example, a bright lime green or blaze orange color may be selected for presenting an arrow or other indicator on a white or black working surface, while a curved or otherwise arcuate shape may be selected for presenting an arrow on a table or countertop having an oval or round shape.

At box 570, the indicator is projected at the selected location onto the working surface in the selected manner. For example, a projector may be configured to cause light of various colors, hues and intensities to be projected upon the working surface in a manner that simulates a three-dimensional appearance or otherwise clearly references the position of the tool, the material or the object required in order to perform the current step of the procedure. At box 580, whether the procedure is complete is determined. If the procedure is complete, then the process ends. If the procedure is not complete, e.g., if the procedure includes two or more steps, and the current step is not the final step, then the process advances to box 590, where a position of a tool, a material or an object required to complete a next step of the procedure, before returning to box 540, where a position of the worker's eyes is determined again.

The rendering of information regarding the execution of one or more actions associated with a task may be shown with regard to FIGS. 6A through 6E. Referring to FIG. 6A through 6E, views of aspects of one system 600 for displaying perspective-aware projected user interfaces in accordance with embodiments of the present disclosure are shown. Except where otherwise noted, reference numerals preceded by the number "6" shown in FIGS. 6A through 6E indicate components or features that are similar to components or features having reference numerals preceded by the number "4" shown in FIG. 4A, 4B or 4C, or by the number "1" shown in the system 100 of FIGS. 1A and 1B.

Figure 6A:
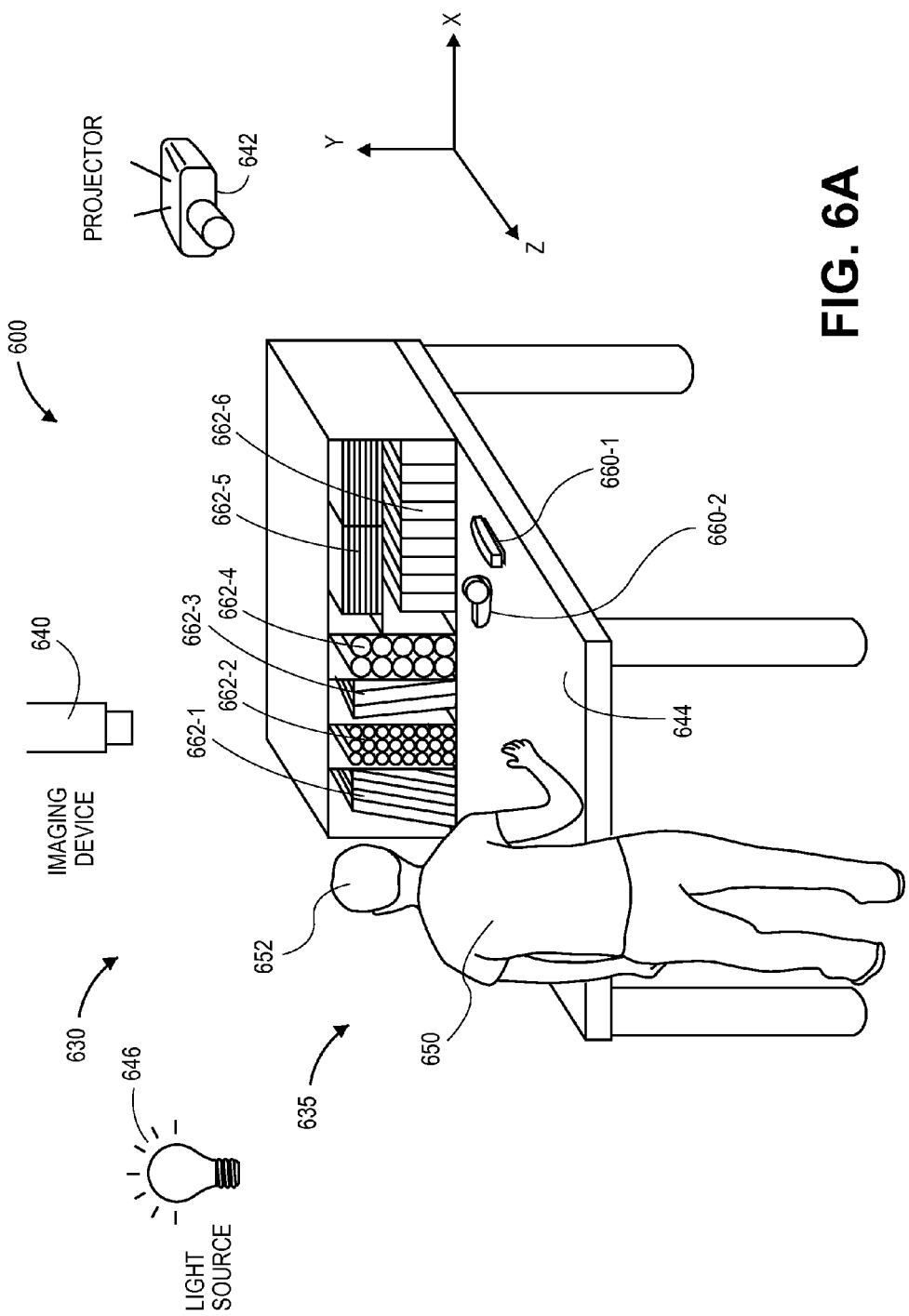
FIGS. 6A through 6E are views of aspects of one system for displaying perspective-aware projected user interfaces in accordance with embodiments of the present disclosure.

As is shown in FIG. 6A, the system 600 includes a work center 630 having a workstation 635 including an imaging device 640, a projector 642, a working surface 644 and a light source 646. The workstation 635 is manned by a worker 650 having a head 652, and includes a variety of tools 660-1, 660-2 placed therein. The workstation 635 further includes a plurality of materials 662-1, 662-2, 662-3, 662-4, 662-5, 662-6 for executing tasks at the workstation 635.

Figure 6B:
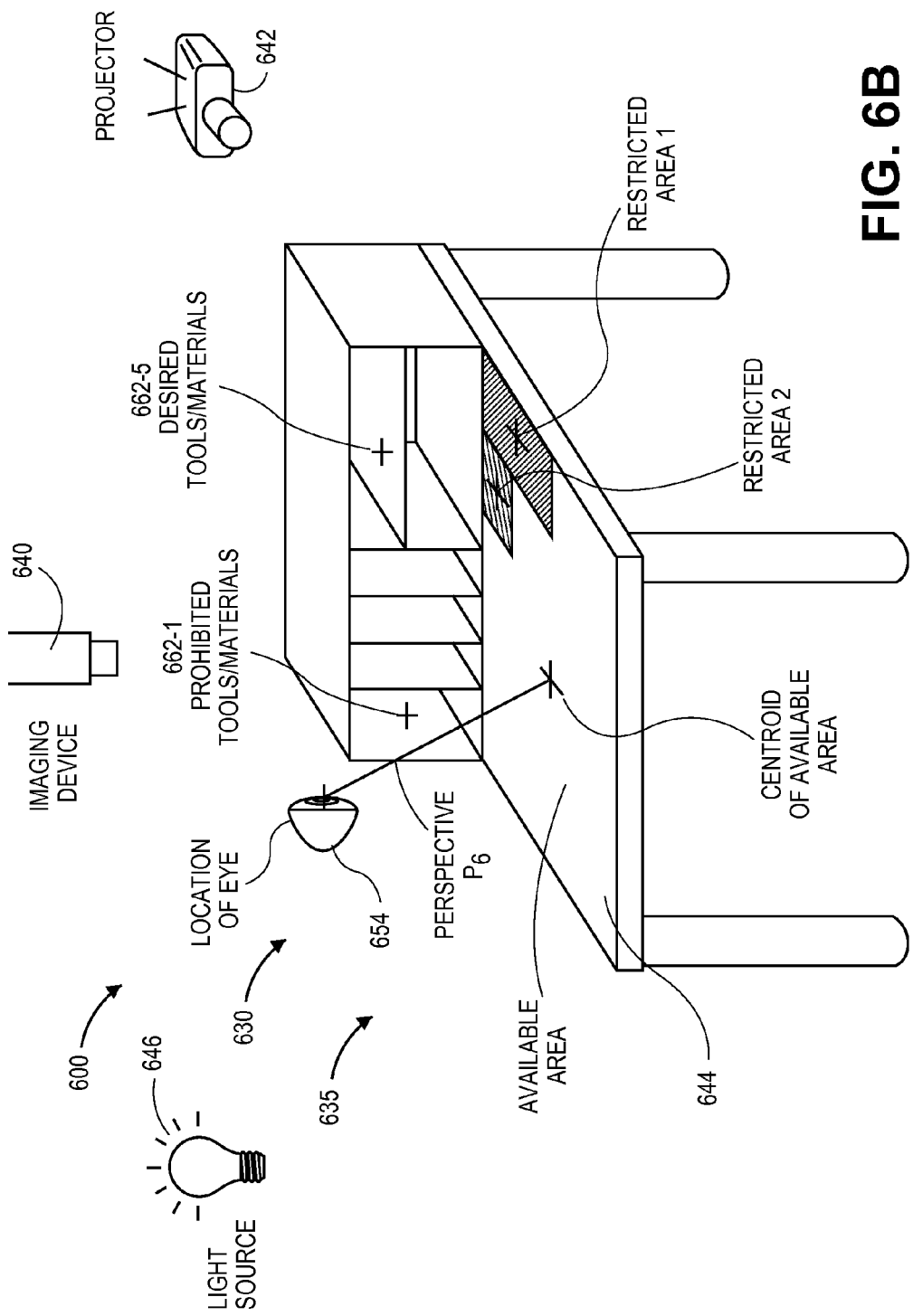

In accordance with the present disclosure, a perspective of a user may be derived based on a position of a head or eyes of the user with respect to available portions of a workstation or working surface upon which information may be projected. Referring to FIG. 6B, a functional view of the system 600 is shown, with a perspective $P_6$ defined by a vantage point, e.g., a position of the eyes 654 of the worker 650, and a centroid of an available area of the working surface 644. The available area may be determined on any basis, e.g., a depth profile or set of ranging information obtained from the imaging device 640, which may be used to determine that tools, materials or objects should not be placed in restricted areas associated with the tools 660-1, 660-2. Moreover, with regard to a given step of a procedure or method, the locations of one or more mandatory or preferred tools, materials or objects, e.g., the materials 662-5, or of one or more prohibited or disfavored tools, materials or objects, e.g., the materials 662-1, may also be determined.

Figure 6C:
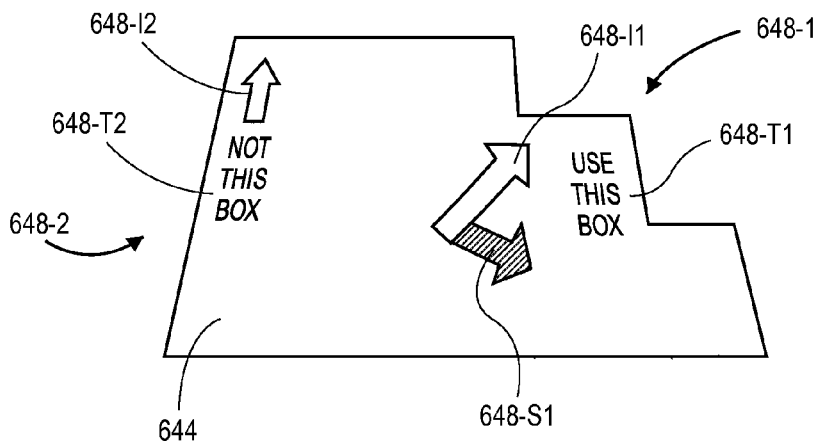

Once the perspective $P_6$ of the worker 650 is determined, the manner in which indicators or information are to be presented to the worker 650 may be selected on any basis, including the locations of the aspects of the workstation 635 that are to be referenced by such indicators or information, as well as a level of interactivity associated with one or more of such aspects. Referring to FIG. 6C, a top view of the working surface 644 is shown. The working surface 644 includes a pair of projections 648-1, 648-2. First, the projection 648-1 includes a projected indicator 648-I1, a projected false shadow 648-S1 and a projected set of text 648-T1. Second, the projection 648-2 includes a projected indicator 648-I2 and a projected set of text 648-T2. Additionally, as is shown in FIG. 6C, the projection 648-1, which directly references the desired tools or materials 662-5, includes the projected false shadow 648-S1 which provides visible three-dimensionality to the projected indicator 648-I1 from the perspective of the worker 650. Conversely, because the projection 648-2 directly references the tools or materials that are prohibited from use, the projected indicator 648-I2 does not include any false shadow or like elements for indicating three-dimensionality or an otherwise enhanced appurtenance thereof.

Figure 6D:
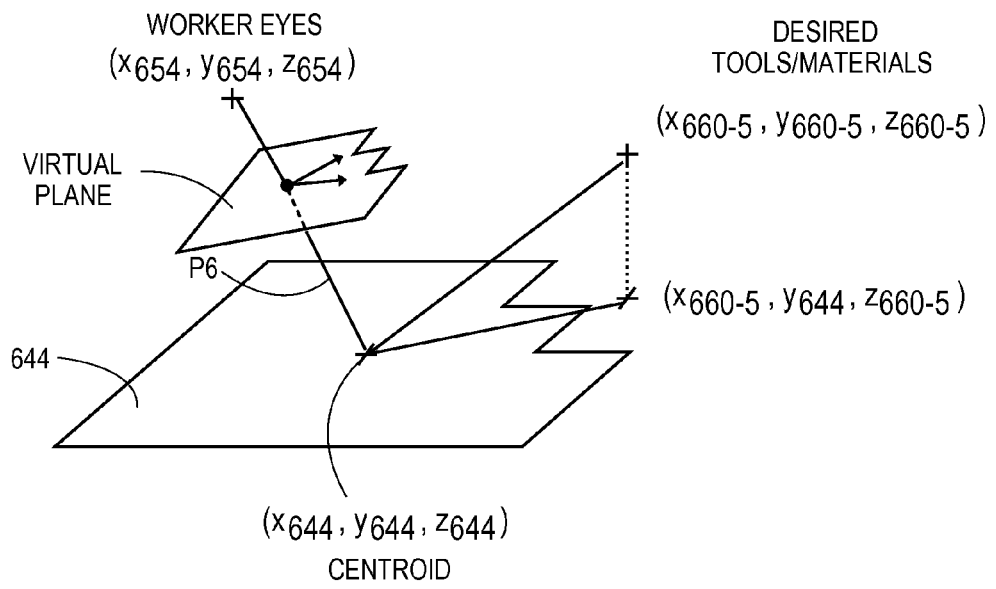

As is also discussed above, the presentation of information may be customized based on a virtual plane located between a user's eyes and a working surface. Referring to FIG. 6D, a virtual plane corresponding to a shape of the available area of the working surface 644 is shown. The virtual plane may be defined based on the vantage point of the worker 650, e.g., a position $(x_{654}, y_{654}, z_{654})$ of his or her eyes 654, as well as a position $(x_{644}, y_{644}, z_{644})$ of a centroid of the available area on the working surface 644. Additionally, a rendering of an indicator or other like information, such as the projected indicator 648-I1 of the projection 648-1 of FIG. 6C, may be selected based on a position of a specific aspect of the workstation 635, e.g., a position $(x_{660-5}, y_{660-5}, z_{660-5})$ of the desired tools or materials 660-5, as well as a position of the light source 646. Finally, the false shadow or other elements for accentuating an indicator or otherwise indicating three-dimensionality may also be defined based on the position $(x_{660-5}, y_{660-5}, z_{660-5})$ of the desired tools or materials 660-5 and the position $(x_{644}, y_{644}, z_{644})$ of the working surface 644. For example, as is shown in FIG. 6D, a tip of a false shadow may be provided at a position $(x_{660-5}, y_{664}, z_{660-5})$.

Figure 6E:
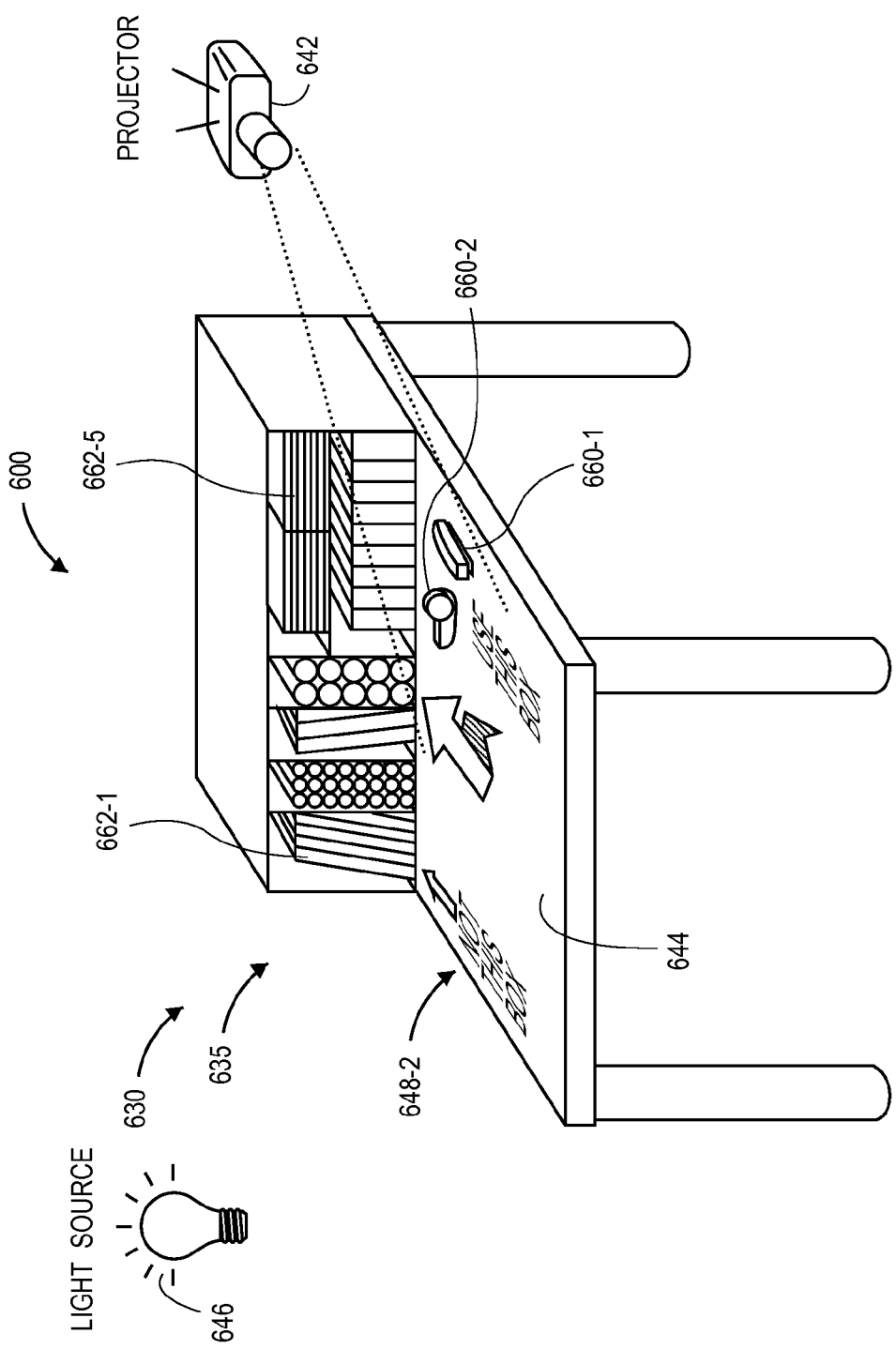

Finally, once the various perspectives of the indicators or other information to be shown on the working surface are determined, projections including such indicators or information may be projected upon a working surface. Referring to FIG. 6E, the system 600 of FIG. 6A is shown, with the projections 648-1, 648-2 of the one or more projected indicators 648-I1, 648-I2, the projected sets of text 648-T1, 648-T2 and the projected false shadow 648S-1 are shown as projected upon the working surface 644 by the projector 642 in a warped or distorted manner that appears theoretically correct to the worker 650 within the virtual plane defined as shown in FIG. 6D.

Figure 7:
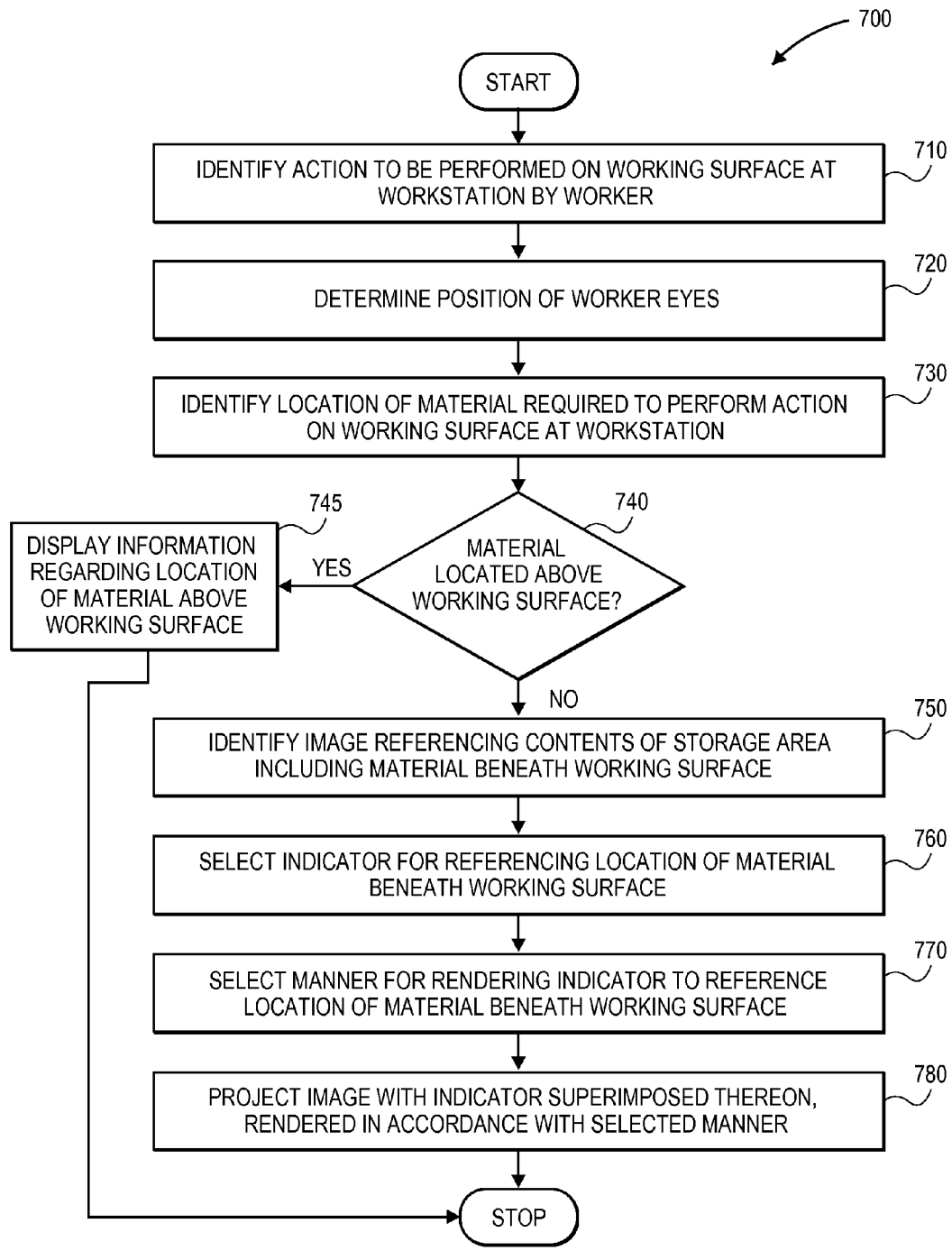
FIG. 7 is a flow chart of one process for displaying perspective-aware projected user interfaces in accordance with embodiments of the present disclosure.

The systems and methods of the present disclosure may be further utilized to provide indicators or other information regarding locations of tools, materials or other objects that are located beneath working surfaces or are otherwise obscured from view. Such other information may further include one or more images representing the contents and/or the positions of such contents that are beneath a given working surface or otherwise obscured from view. Referring to FIG. 7, a flow chart 700 representing one embodiment of a process for displaying perspective-aware projected user interfaces in accordance with embodiments of the present disclosure is shown. At box 710, an action to be performed on a working surface at a workstation by a worker is identified, and at box 720, a position of the worker's eyes is determined. At box 730, a location of material required to perform an action on the working surface at the workstation is identified. For example, at a packing station, the material may include not only containers but also dunnage, adhesives or like materials, in addition to tools or other objects, for packing or unpacking containers at the packing station.

At box 740, whether the material is located above the working surface is determined. If the material is located above the working surface, e.g., within one or more of the slots or shelves of the workstation 135 of FIGS. 1A and 1B, then the process advances to box 745, where information regarding the location of the material above the working surface is displayed, e.g., in accordance with one or more methods of the present disclosure, such as one or more of the processes represented by the flow chart 300 of FIG. 3 or the flow chart 500 of FIG. 5.

If the material is not located above the working surface, e.g., if the material is located beneath the working surface, then the process advances to box 750, where an image referencing the contents of the storage area including the material beneath the working surface is identified. Such an image may be updated immediately based on changes to such contents, or on a regular basis or at regular intervals, or in any other manner. Additionally, the image may be a high-resolution image of the actual contents of the storage area and their actual locations beneath the working surface or, alternatively, a lower-resolution image which simulates the appearance of the contents beneath the working surface and their respective locations.

At box 760, an indicator for referencing the location of the material beneath the working surface is selected. The indicator may be chosen on any basis, including but not limited to the type of material, the actual or the estimated location of the material, or any other intrinsic or extrinsic factor relating to the purpose of the action. At box 770, a manner in which the indicator is to be rendered for referencing the location of the material beneath the working surface is selected. The manner may include or incorporate one or more false shadows or other elements for simulating three-dimensionality of the indicator, or otherwise specify one or more attributes of the indicators, e.g., colors, shapes, sizes or types thereof, which are to be displayed on the working surface.

At box 780, the image identified at box 750 is projected onto the working surface with the indicator selected at box 760 superimposed thereon and rendered in accordance with the manner selected at box 770, and the process ends. For example, an image of tools, materials or objects at one or more levels beneath a surface may be projected onto the surface along with an arrow or other indicator specifically referencing one such tool, material or object, and the arrow or indicator may be rendered in particular manner that accentuates the appearance thereof on the image.

Figure 8A:
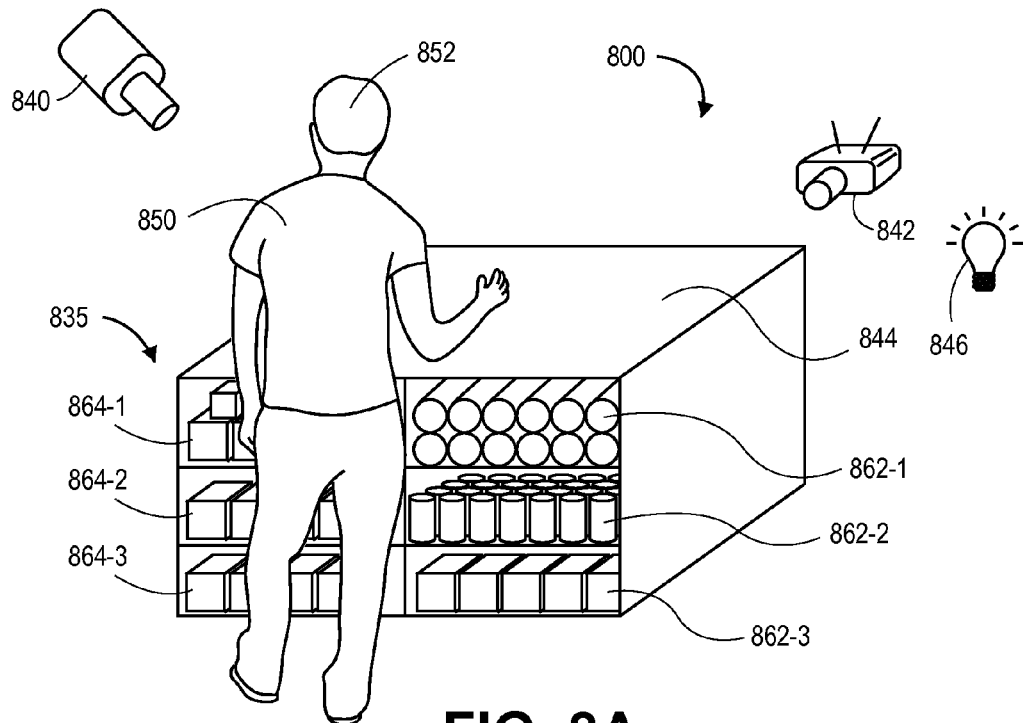
FIGS. 8A, 8B and 8C are views of aspects of one system for displaying perspective-aware projected user interfaces in accordance with embodiments of the present disclosure.
Figure 8B:
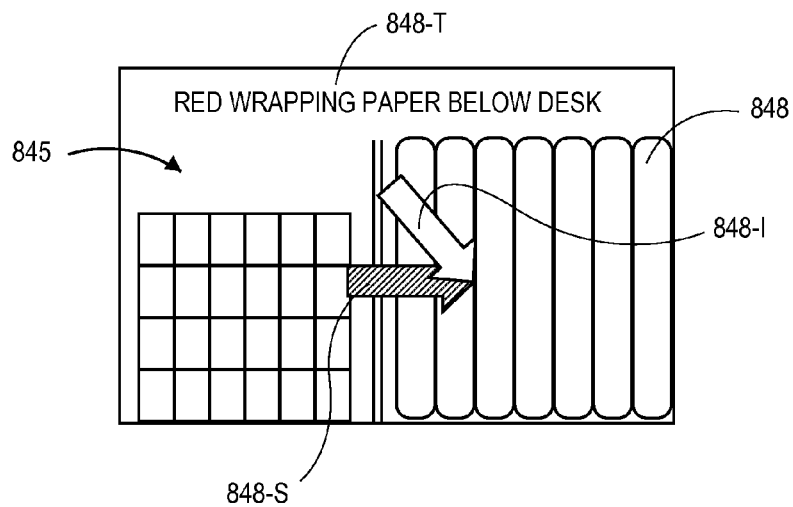
Figure 8C:
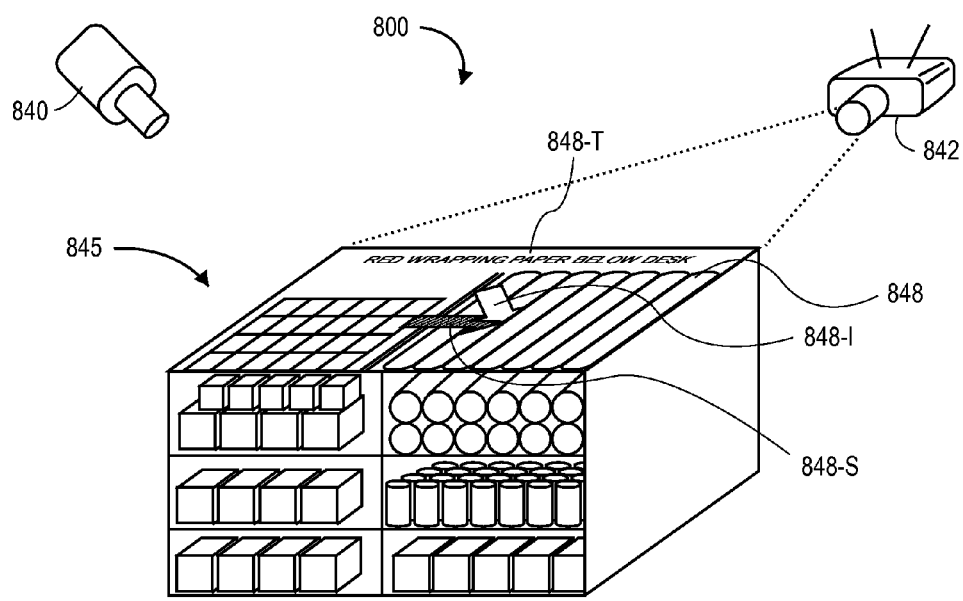

The projection of an arrow or indicator referencing a location beneath a working surface onto the working surface along with an image of a current status or condition of the location beneath the working surface is shown with regard to FIGS. 8A, 8B and 8C. Referring to FIGS. 8A, 8B and 8C, views of aspects of one system 800 for displaying perspective-aware projected user interfaces in accordance with embodiments of the present disclosure are shown. Except where otherwise noted, reference numerals preceded by the number "8" shown in FIG. 8A, 8B or 8C indicate components or features that are similar to components or features having reference numerals preceded by the number "6" shown in FIGS. 6A through 6E, by the number "4" shown in FIG. 4A, 4B or 4C, or by the number "1" shown in the system 100 of FIGS. 1A and 1B.

As is shown in FIG. 8A, the system 800 includes a workstation 835 having an imaging device 840, a projector 842, a working surface 844 and a light source 846. A worker 850 having a head 852 is staffing the workstation 835, which includes a plurality of materials 862-1, 862-2, 862-3 and objects 864-1, 864-2, 864-3 disposed beneath the working surface 844.

In accordance with the present disclosure, an image corresponding to a real time, near-real time or substantially recent status of an environment beneath a working surface may be identified and projected upon the working surface along with one or more indicators or other information. Referring to FIG. 8B, an image 845 having a projection 848 superimposed thereon is shown. The projection 848 includes a projected indicator 848-I specifically configured to appear to reference one or more regions beneath a surface of the working surface 844, as well as a projected false shadow 848-S and a projected set of text 848-T ("Red Wrapping Paper Below Desk") to accompany the projected indicator 848-I. For example, the projected indicator 848-I comprises an arrow that is intended to appear as originating above the image 845, and intersecting with the image 845 at a single point. The projected false shadow 848-S is intended to appear within or coplanar to the image 845, and meets the projected indicator 848-I at the point at which the projected indicator 848-I appears to meet the image 845.

Once an image of the contents beneath a working surface and indicators or other information for referencing one or more tools, materials or other objects included in such contents are identified, the image and the indicators or other information may be projected upon the working surface using one or more projectors. Referring to FIG. 8C, a view of the system 800 of FIG. 8A is shown, with the image 845 and the projection 848 of FIG. 8B projected upon the working surface 844. Thus, a worker performing a given task at the workstation 835, e.g., wrapping a gift, may view the projected set of text 848-T and the projected indicator 848-I, and understand that the desired materials are located beneath the working surface 844 based on the three-dimensionality provided to the projected indicator 848-I by the projected false shadow 848-S. More specifically, because the projected indicator 848-I appears to originate above the working surface 844 from a perspective of the worker 850, meeting the working surface 844 at a point thereon, and to reference a specific one of the materials 862-1, the worker 850 may be prompted to peer beneath the working surface 844 and to retrieve the materials 862-1 therefrom. Moreover, as the worker 850 moves his or her head 852 to look beneath the working surface 844, such movements may be recognized, e.g., using imaging data captured by the imaging device 840, and the projection 848 may be adjusted accordingly to account for the new perspective of the worker 850.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. For example, although some of the embodiments described herein or shown in the accompanying figures refer to the use of digital cameras and the like posted in fulfillment centers, the systems and methods disclosed herein are not so limited, and utilize any type of imaging device applied in any environment and for any purpose.

Moreover, as is discussed above, although some of the embodiments described herein or shown in the accompanying figures refer to the use of false shadows or other depth elements for the purpose of synthesizing a three-dimensional view or otherwise displaying an indicator or other information with three-dimensionality, those of ordinary skill in the pertinent arts will recognize that any other system or method for displaying indicators or other information in a three-dimensional manner, e.g., by displaying such indicators or other information with one or more simulated specularities or points of specular reflection, or with simulated parallax effects, may be applied in accordance with the present disclosure. Additionally, although some of the embodiments disclosed herein reference actual, physical light sources within an environment, the systems and methods disclosed herein are not so limited. For example, such systems and methods may be used in connection with any type or form of light source, including but not limited to virtual lights or virtual light sources which can emulate any physical lights in an environment, or placed and parameterized in order to achieve a desired effect.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIGS. 3, 5 and 7, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A workstation comprising:
  a working surface;
  a projector configured to project light upon at least a portion of the working surface;
  an imaging device; and
  a computing device in communication with the imaging device and the projector,
  wherein the computing device is configured to implement one or more services, and
  wherein the one or more services are configured to:
    capture imaging data of at least a portion of the workstation;
    determine a vantage point of a user based at least in part on the imaging data;
    identify information regarding a task to be performed by the user, wherein the information relates to at least one object maintained in a storage area;
    determine a position of at least one light source provided within the workstation;
    determine a position of the storage area in which the at least one object is maintained based at least in part on the imaging data;

determine a location on the portion of the working surface for projecting an indicator associated with the at least one object based at least in part on the imaging data;
select a rendering for the indicator based at least in part on at least one of the vantage point of the user, the position of the at least one light source or the location on the portion of the working surface, wherein the selected rendering for the indicator comprises a synthetic three-dimensional view of the indicator;
define a projection to be projected upon the portion of the working surface at the location in accordance with the selected rendering of the indicator; and
project the projection upon the portion of the working surface at the location using the projector.

2. The workstation of claim 1, wherein the one or more services are further configured to:
select a virtual plane based at least in part on the vantage point of the user and the location on the portion of the working surface for projecting the indicator;
wherein the rendering for the indicator is selected such that the indicator appears in the synthetic three-dimensional view within the selected virtual plane.

3. The workstation of claim 1, wherein the one or more services are further configured to:
determine at least one of a location or an orientation of a shadow element associated with the indicator based at least in part on the at least one of the vantage point of the user, the position of the at least one light source or the location on the portion of the working surface,
wherein the projection further comprises the shadow element.

4. A computer-implemented method comprising:
identifying information regarding at least one action associated with a task to be performed on a surface of a workstation;
identifying a position of at least one light source associated with the workstation;
identifying at least one aspect of the workstation associated with the at least one action;
identifying an indicator of the at least one aspect of the workstation;
defining a first manner in which the indicator is to be projected upon the surface with three-dimensionality, wherein the first manner is defined based at least in part on the position of the at least one light source; and
causing, by at least one computer processor, at least one projector to project at least the indicator upon the surface in accordance with the first manner.

5. The computer-implemented method of claim 4, further comprising:
determining a first perspective of a user at the workstation; and
determining a location of the at least one aspect of the workstation,
wherein the first manner is defined based at least in part on the first perspective of the user and the location of the at least one aspect of the workstation.

6. The computer-implemented method of claim 5, wherein determining the first perspective of the user at the workstation further comprises:
determining a position of at least one eye of the user,
wherein the first perspective is determined based at least in part on the position of the at least one eye of the user.

7. The computer-implemented method of claim 6, wherein determining the position of the at least one eye of the user comprises:
determining a position of a head of the user,
wherein the position of the at least one eye of the user is determined based at least in part on the position of the head of the user.

8. The computer-implemented method of claim 5, wherein defining the first manner in which the indicator is to be projected upon the surface with three-dimensionality further comprises:
defining at least one shadow element corresponding to the indicator of the at least one aspect of the workstation,
selecting at least one of a location of the at least one shadow element or an orientation of the at least one shadow element based at least in part on at least one of:
at least one attribute of the indicator; or
the first perspective of the user at the workstation,
wherein the first manner presents the at least one shadow element in the selected location or the selected orientation with respect to the indicator.

9. The computer-implemented method of claim 5, wherein defining the first manner in which the indicator is to be projected upon the surface with three-dimensionality further comprises:
determining at least one attribute of the indicator; and
selecting a location on the surface for the indicator based at least in part on the at least one attribute and the location of the at least one aspect of the workstation.

10. The computer-implemented method of claim 9, wherein defining the first manner in which the indicator is to be projected upon the surface with three-dimensionality further comprises:
selecting a virtual plane within which the indicator of the at least one aspect of the workstation is to appear to the user based at least in part on the first perspective of the user and the selected location on the surface for the indicator; and
defining a projection onto the surface, wherein the projection onto the surface comprises the indicator, and wherein the projection onto the surface corresponds to the virtual plane,
wherein causing the at least one projector to project at least the indicator upon the surface in accordance with the first manner comprises:
causing the at least one projector to project the projection onto the surface.

11. The computer-implemented method of claim 10, further comprising:
deriving a depth profile of at least a portion of the workstation using imaging data captured by at least one imaging device; and
selecting at least one of the location of the at least one aspect of the workstation or the location on the surface for the indicator based at least in part on the depth profile.

12. The computer-implemented method of claim 9, wherein the location of the at least one aspect of the workstation is within at least one region beneath the surface.

13. The computer-implemented method of claim 12, wherein defining the first manner in which the indicator is to be projected upon the surface with three-dimensionality further comprises:
identifying an image of the at least one region beneath the surface, and
wherein causing the at least one projector to project at least the indicator upon the surface in accordance with the first manner further comprises:

causing, by the at least one computer processor, the at least one projector to project at least the image of the at least one region onto at least a portion of the surface.

14. The computer-implemented method of claim 5, further comprising:
    determining a second perspective of the user at the workstation; and
    defining a second manner in which the indicator is to be projected upon the surface based at least in part on the second perspective of the user; and
    causing, by the at least one computer processor, the at least one projector to project at least the indicator upon the surface in accordance with the second manner.

15. The computer-implemented method of claim 4, wherein causing the at least one projector to project at least the indicator upon the surface in accordance with the first manner further comprises:
    causing, by the at least one computer processor, the at least one projector to project a set of text associated with the indicator upon the surface.

16. The computer-implemented method of claim 4, wherein the at least one aspect of the workstation comprises at least one of:
    a tool associated with the at least one action and located within a vicinity of the workstation;
    a material associated with the at least one action and located within the vicinity of the workstation; or
    an object associated with the at least one action and located within the vicinity of the workstation.

17. A non-transitory computer-readable medium having computer-executable instructions stored thereon,
    wherein the instructions, when executed, cause a computer system having at least one computer processor and at least one data store to perform a method comprising:
    identifying a process to be performed at a workstation, wherein the process comprises a plurality of steps;
    determining a first location of at least one aspect of the workstation corresponding to a first one of the plurality of steps;
    determining a location of a light source at the workstation;
    determining a first perspective of a user, wherein the first perspective is based at least in part on a first position of an eye of the user;
    selecting a first rendering of a first indicator of the first location of the at least one aspect of the workstation corresponding to the first one of the plurality of steps, wherein the first rendering simulates a three-dimensional view of the first indicator, and wherein the first rendering is selected based at least in part on at least one of the first perspective of the user, the first location of the at least one aspect of the workstation corresponding to the first one of the plurality of steps or the location of the light source at the workstation;
    causing a projection of the first rendering of the first indicator on at least a portion of a working surface of the workstation;
    receiving an indication that the first one of the plurality of steps is complete;
    determining a second location of at least one aspect of the workstation corresponding to a second one of the plurality of steps;
    selecting a second rendering of a second indicator of the second location of the at least one aspect of the workstation corresponding to the second one of the plurality of steps, wherein the second rendering simulates a three-dimensional view of the second indicator, and wherein the second rendering is selected based at least in part on at least one of the second location of the at least one aspect of the workstation corresponding to the second one of the plurality of steps or the location of the light source at the workstation; and
    causing a projection of the second rendering of the second indicator on at least the portion of the working surface of the workstation.

18. The non-transitory computer-readable medium of claim 17, wherein the method further comprises:
    determining a second perspective of the user, wherein the second perspective is determined based at least in part on a second position of the eye of the user;
    wherein the second rendering is selected based at least in part on the second perspective of the user.

19. The non-transitory computer-readable medium of claim 17, wherein the method further comprises:
    capturing imaging data regarding at least a portion of the workstation,
    wherein at least one of the first location of the at least one aspect of the workstation corresponding to the first one of the plurality of steps or the second location of the at least one aspect of the workstation corresponding to the second one of the plurality of steps is determined based at least in part on the imaging data regarding at least the portion of the workstation.

20. The non-transitory computer-readable medium of claim 19, wherein the method further comprises:
    determining a first position of a head of the user based at least in part on the imaging data; and
    estimating the first position of the eye of the user based at least in part on the first position of the head of the user.

* * * * *